(12) United States Patent
Kanematsu

(10) Patent No.: US 10,649,754 B2
(45) Date of Patent: May 12, 2020

(54) IMAGE PROCESSING DEVICE AND ELECTRONIC WHITEBOARD

(71) Applicant: RICOH COMPANY, LTD., Ohta-ku, Tokyo (JP)

(72) Inventor: Shoichiro Kanematsu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 29 days.

(21) Appl. No.: 15/652,423

(22) Filed: Jul. 18, 2017

(65) Prior Publication Data

US 2017/0315793 A1 Nov. 2, 2017

Related U.S. Application Data

(63) Continuation of application No. PCT/JP2016/000151, filed on Jan. 13, 2016.

(30) Foreign Application Priority Data

Jan. 28, 2015 (JP) ................. 2015-014520

(51) Int. Cl.
*G06F 9/44* (2018.01)
*G06F 9/445* (2018.01)
(Continued)

(52) U.S. Cl.
CPC .............. *G06F 8/61* (2013.01); *G06F 21/121* (2013.01); *G06F 21/74* (2013.01)

(58) Field of Classification Search
CPC ........... G06F 21/121; G06F 21/74; G06F 8/61
See application file for complete search history.

(56) References Cited

U.S. PATENT DOCUMENTS 7,865,670 B2 * 1/2011 Cota-Robles ....... G06F 12/1036
711/133
8,266,692 B2 * 9/2012 Wenzinger ................ G06F 8/60
713/2

(Continued)

FOREIGN PATENT DOCUMENTS

CN 1518692 A 8/2004
CN 101068183 A 11/2007

(Continued)

OTHER PUBLICATIONS

Sebastian Obermeier, Securing Industrial Automation and Control Systems Using Application Whitelisting, 2014, pp. 1-4. https://ieeexplore.ieee.org/stamp/stamp.jsp?arnumber=7005242 (Year: 2014).*

(Continued)

*Primary Examiner* — Mongbao Nguyen
(74) *Attorney, Agent, or Firm* — Xsensus LLP

(57) ABSTRACT

An electronic whiteboard includes a white list in which predetermined software is registered, a mode switching unit configured to switch a normal mode in which software unregistered in the white list is not permitted to be installed and an install mode in which the unregistered software is permitted to be installed, an invalidating/validating processor configured to invalidate the white list in the install mode, and a registerer configured to register software installed while the white list is invalidated in the white list, in which the invalidating/validating processor validates the white list after the installed software is registered in the white list.

4 Claims, 15 Drawing Sheets

(51) Int. Cl.
*G06F 8/61* (2018.01)
*G06F 21/12* (2013.01)
*G06F 21/74* (2013.01)

(56) References Cited

U.S. PATENT DOCUMENTS

| | | | | |
|---|---|---|---|---|
| 8,950,007 | B1* | 2/2015 | Teal | G06F 21/554 726/30 |
| 9,298,361 | B2* | 3/2016 | Shepherd | G06F 3/0482 |
| 9,449,262 | B2* | 9/2016 | Osada | G06F 11/0793 |
| 9,471,799 | B2* | 10/2016 | Schiffman | G06F 21/62 |
| 2004/0243994 | A1* | 12/2004 | Nasu | G06F 8/65 717/171 |
| 2009/0013409 | A1* | 1/2009 | Wenzinger | G06F 8/60 726/24 |
| 2009/0083520 | A1* | 3/2009 | Kanemura | G06F 12/1458 712/43 |
| 2009/0320048 | A1* | 12/2009 | Watt | G06F 9/4812 719/319 |
| 2010/0095294 | A1* | 4/2010 | Yamada | G06F 8/61 717/174 |
| 2012/0036220 | A1* | 2/2012 | Dare | G06F 8/61 709/217 |
| 2012/0099219 | A1* | 4/2012 | Al-Azzawi | G06F 21/56 360/62 |
| 2012/0131681 | A1* | 5/2012 | Layson | G06F 21/125 726/28 |
| 2012/0222115 | A1 | 8/2012 | Calcaterra et al. | |
| 2013/0007842 | A1* | 1/2013 | Park | G06F 21/74 726/3 |
| 2013/0298208 | A1* | 11/2013 | Ayed | G06F 21/00 726/6 |
| 2013/0305354 | A1* | 11/2013 | King | G06F 21/31 726/19 |
| 2013/0324089 | A1* | 12/2013 | Kim | G06F 21/32 455/411 |
| 2014/0090077 | A1 | 3/2014 | Jeong et al. | |
| 2014/0215211 | A1* | 7/2014 | Rehani | G06F 21/14 713/168 |
| 2014/0259178 | A1 | 9/2014 | Karaa et al. | |
| 2014/0283142 | A1* | 9/2014 | Shepherd | G06F 3/0482 726/30 |
| 2015/0058979 | A1* | 2/2015 | Peeters | G06F 21/575 726/22 |
| 2015/0074657 | A1* | 3/2015 | Bhat | G06F 8/65 717/170 |
| 2015/0089213 | A1* | 3/2015 | Isozaki | G06F 21/74 713/155 |
| 2015/0100890 | A1* | 4/2015 | Kosmiskas | G06F 3/0484 715/744 |
| 2015/0193614 | A1* | 7/2015 | Fanton | G06F 21/10 713/165 |
| 2015/0193618 | A1* | 7/2015 | Takano | G06F 21/554 726/23 |
| 2016/0085955 | A1* | 3/2016 | Lerner | G06F 21/31 726/20 |
| 2016/0085976 | A1* | 3/2016 | Schiffman | G06F 21/62 726/30 |
| 2016/0088011 | A1* | 3/2016 | Johri | H04L 63/1441 726/23 |
| 2016/0099969 | A1* | 4/2016 | Angus | H04L 63/0876 713/158 |
| 2016/0300055 | A1 | 10/2016 | Karaa et al. | |

FOREIGN PATENT DOCUMENTS

| | | | |
|---|---|---|---|
| CN | 103324506 A | | 9/2013 |
| EP | 2521032 A1 * | 11/2012 | G06F 21/575 |
| JP | 2005-92649 A | | 4/2005 |
| JP | 2008-097371 | | 4/2008 |
| JP | 2008-262454 | | 10/2008 |
| JP | 2010-097428 | | 4/2010 |
| JP | 2010-211611 | | 9/2010 |
| JP | 2012-108760 | | 6/2012 |
| KR | 10-1308859 B1 | | 9/2013 |

OTHER PUBLICATIONS

Jingfei Kong, Architecting against Software Cache-Based Side-Channel Attacks, 2013, pp. 1276-1287. https://ieeexplore.ieee.org/stamp/stamp.jsp?tp=&arnumber=6178238 (Year: 2013).*

Lotfi ben Othmane, Extending the Agile Development Process to Develop Acceptably Secure Software, 2014, pp. 497-506. https://ieeexplore.ieee.org/stamp/stamp.jsp?tp=&arnumber=6702438 (Year: 2014).*

Dan Peng, Research on DDoS Filtering Algorithm based on Bloom Filter WhiteList, 2008, pp. 291-296. https://ieeexplore.ieee.org/stamp/stamp.jsp?tp=&arnumber=5089117 (Year: 2008).*

Aaron Beuhring, Beyond Blacklisting: Cyberdefense in the Era of Advanced Persistent Threats, 2014, pp. 90-93. https://ieeexplore.ieee.org/staMp/staMp.jsp?tp=&arnumber=6924678 (Year: 2014).*

Murray Mckay, Best Practices in Automation Security, 2012, pp. 1-15. http://ieeexplore.ieee.org/stamp.jsp?tp=&arnumber=6215678 (Year: 2015).*

Extended European Search Report dated Jan. 9, 2018 in Patent Application No. 16742915.8, 11 pages.

International Search Report dated Feb. 9, 2016 in PCT/JP2016/000151 filed on Jan. 13, 2016.

Written Opinion dated Feb. 9, 2016 in PCT/JP2016/000151 filed on Jan. 13, 2016.

Yukio Sakajo, Security Measure Software WhiteShield, Meiden Review No. 4, Oct. 26, 2009, pp. 10-13 (17 total pages with English Translation).

Office Action issued in Chinese Application 201680007480.1 dated Dec. 18, 2019.

* cited by examiner

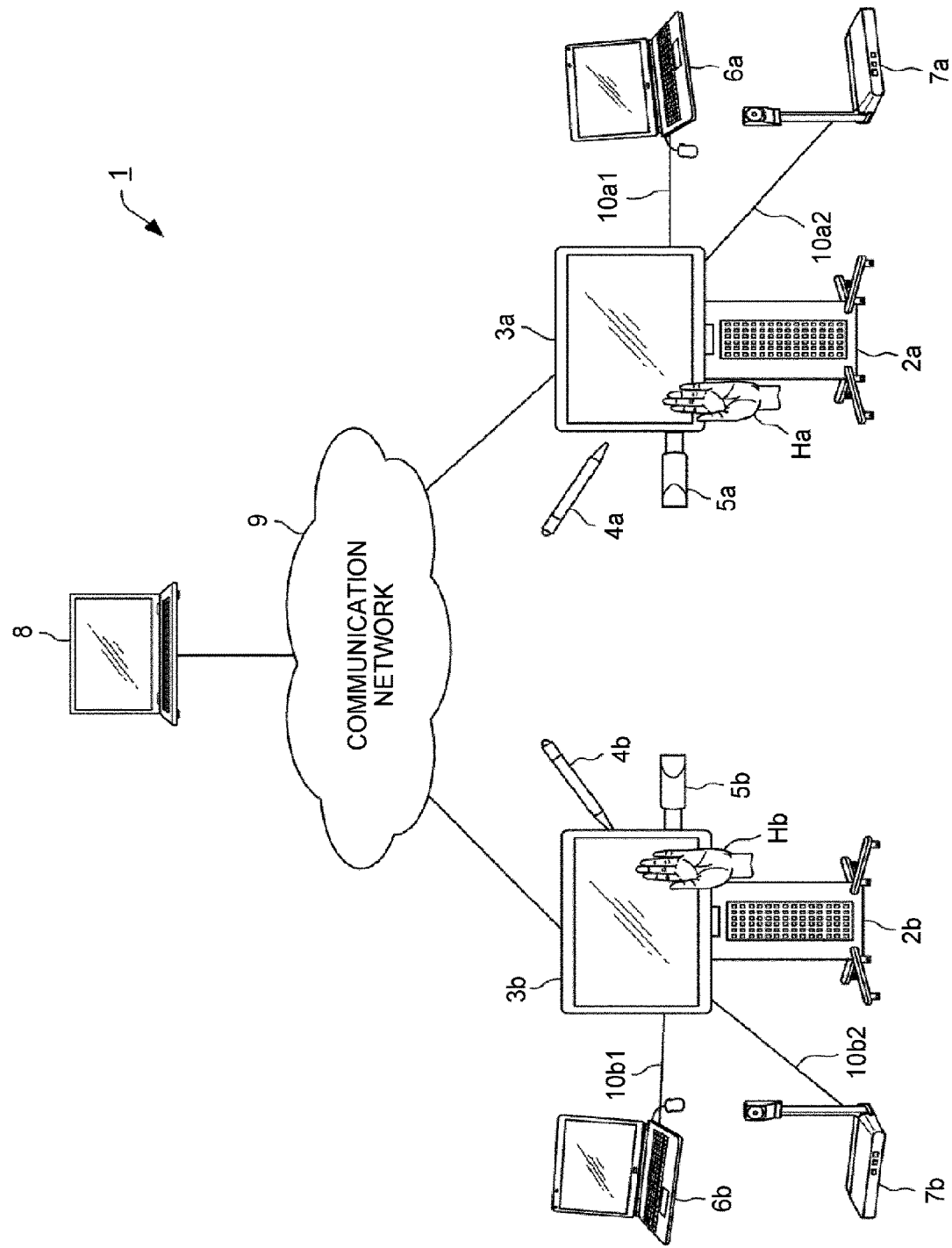
[Fig. 1]

[Fig. 2]
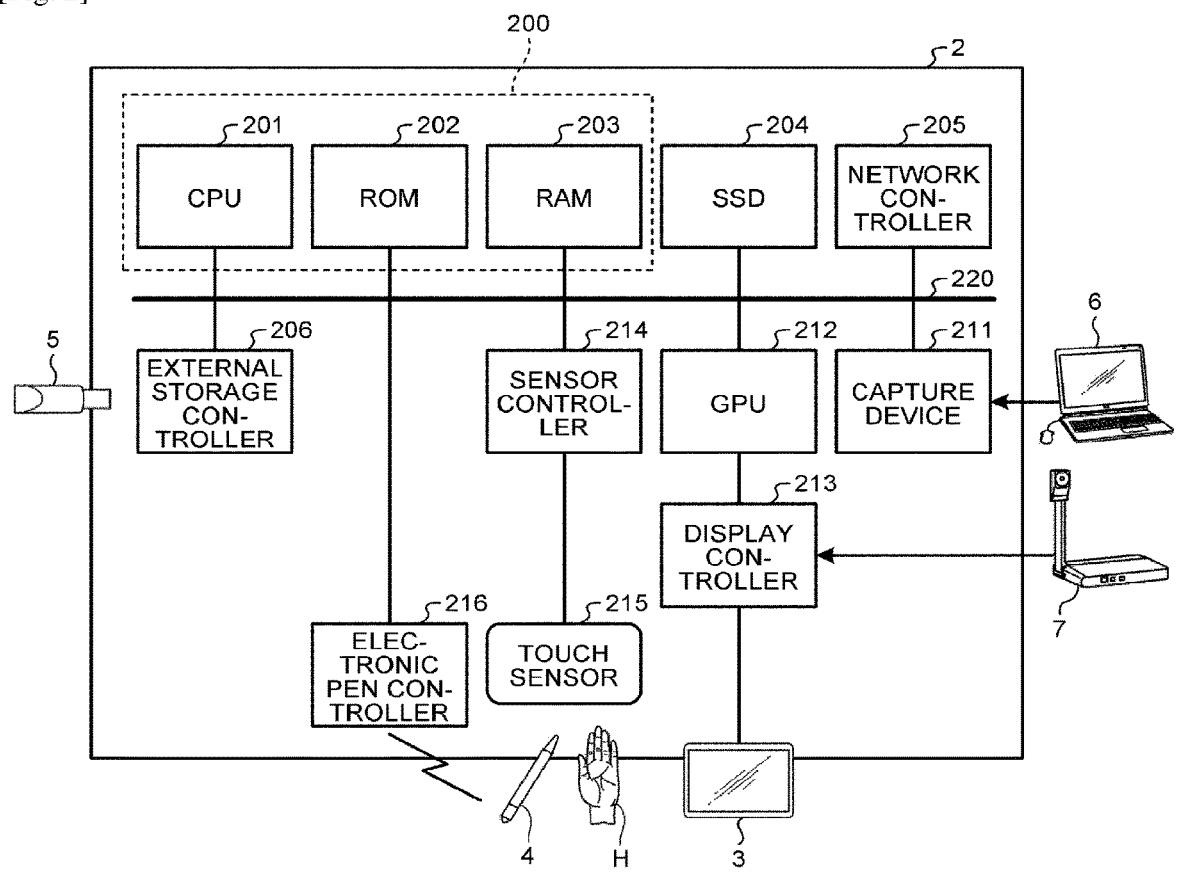

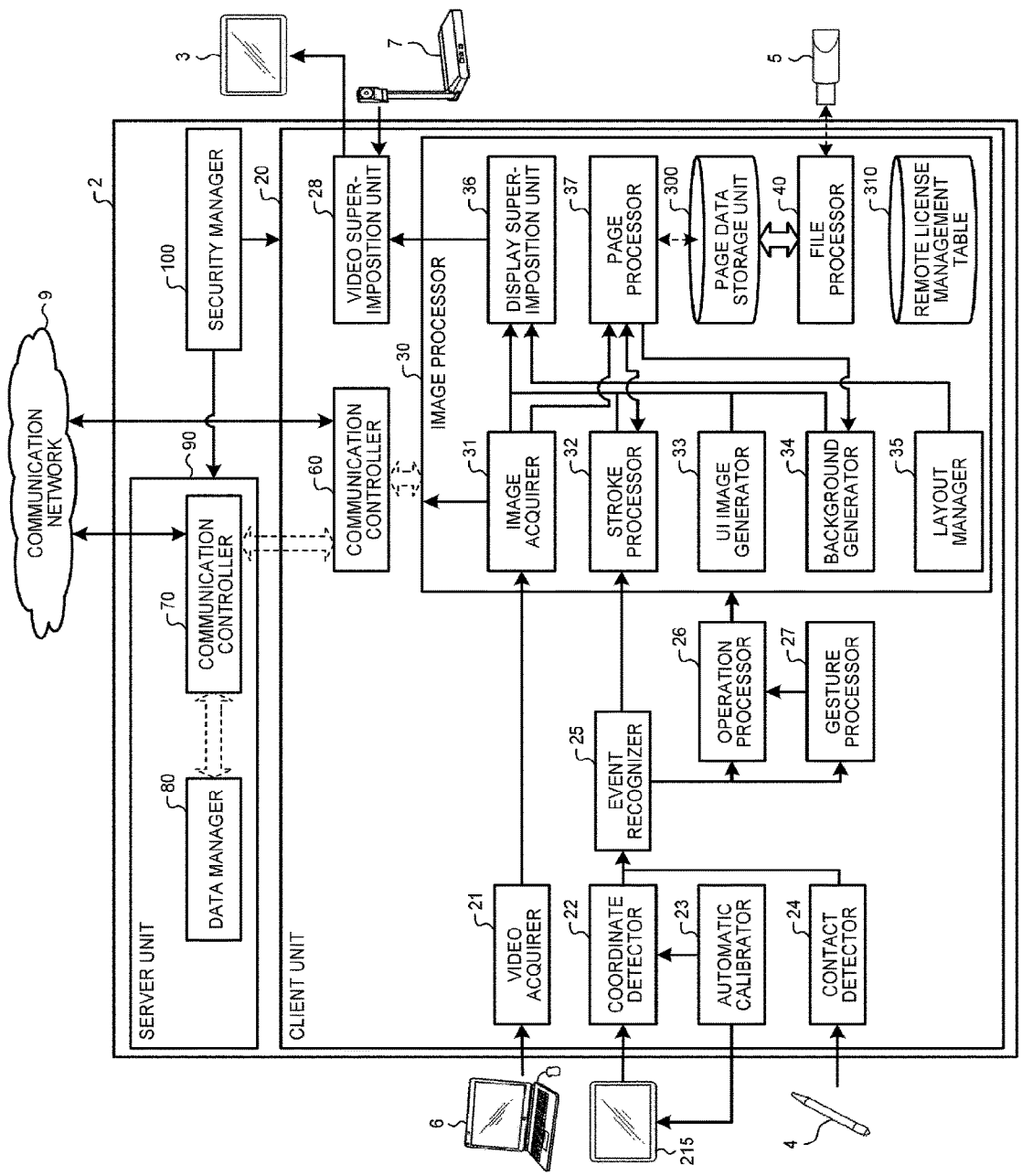
[Fig. 3]

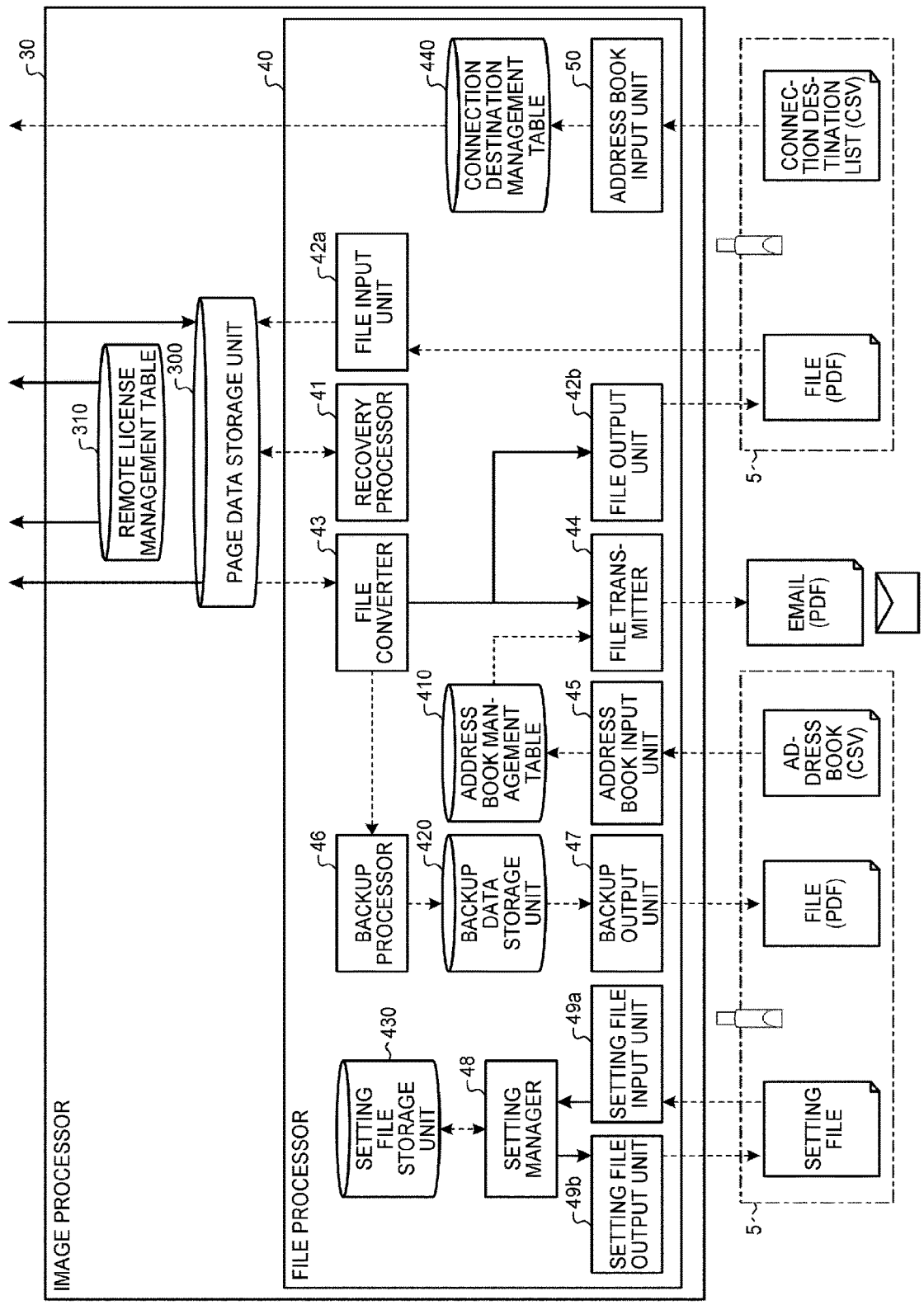
[Fig. 4]

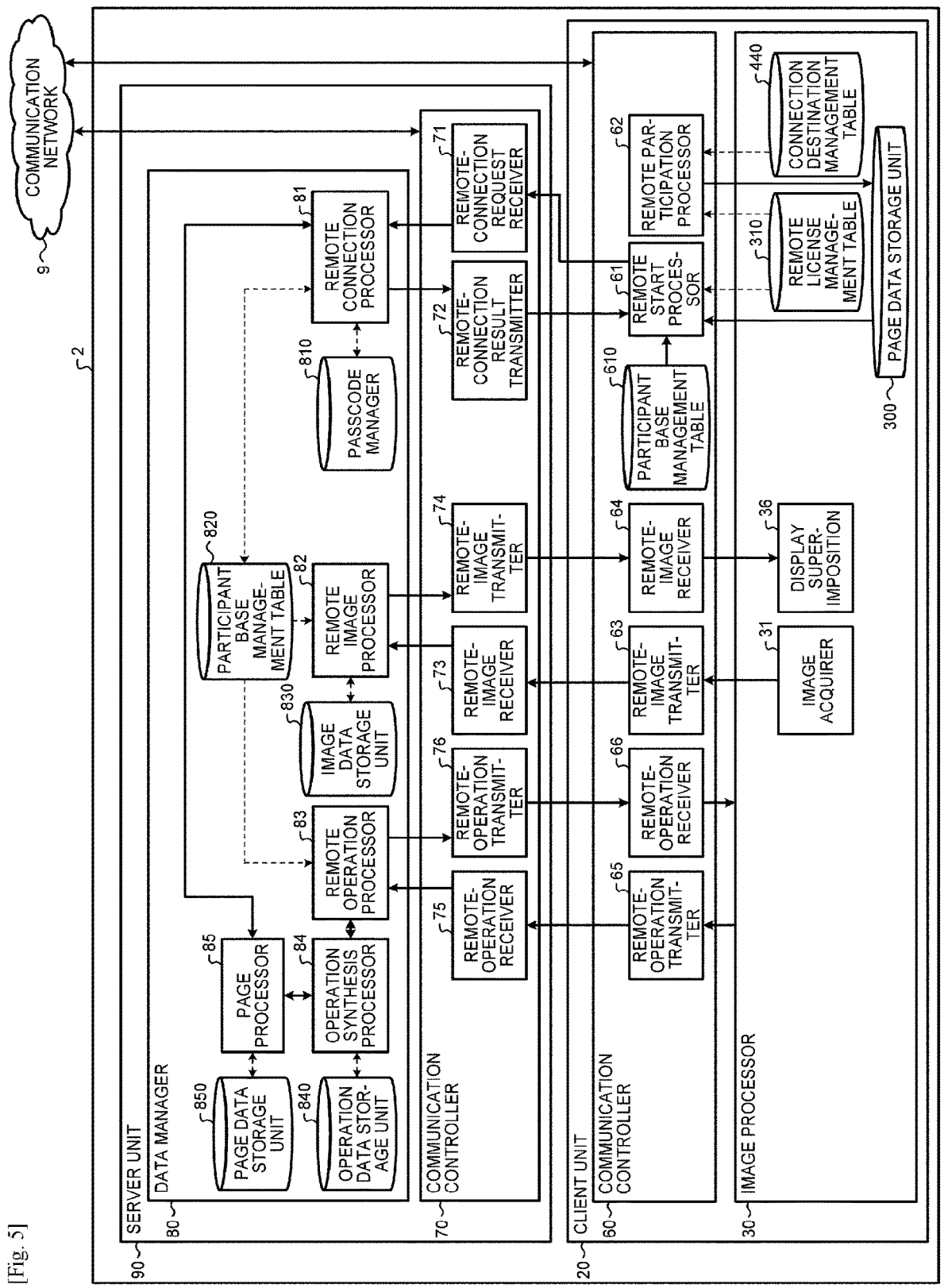
[Fig. 5]

[Fig. 6]

| PAGE DATA ID | START TIME | END TIME | STROKE ARRANGEMENT DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ⋮ | ⋮ | ⋮ | ⋮ | ⋮ |

| STROKE DATA ID | START TIME | END TIME | COLOR | WIDTH | COORDINATE ARRANGEMENT DATA ID |
|---|---|---|---|---|---|
| s001 | 20130610102502 | 20130610102505 | ff0000 | 2 | c001 |
| s002 | 20130610102612 | 20130610102615 | 000ff0 | 3 | c002 |
| s003 | 20130610102704 | 20130610102712 | 0 | 1 | c003 |
| ⋮ | ⋮ | ⋮ | ⋮ | ⋮ | ⋮ |

| X COORDINATE VALUE | Y COORDINATE VALUE | TIME DIFFERENCE | WRITING PRESSURE |
|---|---|---|---|
| 10 | 10 | 100 | 255 |
| 12 | 10 | 200 | 255 |
| 14 | 12 | 300 | 255 |
| ⋮ | ⋮ | ⋮ | ⋮ |

[Fig. 9]

| MEDIA DATA ID | DATA TYPE | RECORDING TIME | X COORDI-NATE VALUE | Y COORDI-NATE VALUE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| . . . | . . . | . . . | . . . | . . . | . . . | . . . | . . . |

[Fig. 10]

| PRODUCT ID | LICENSE ID | EXPIRATION DATE |
|---|---|---|
| 1001 | 12345678abcdefgh | 2012/12/31 |
| 1001 | 4321dcba8765hgfe | – |
| . . . | . . . | . . . |

[Fig. 11]

| NAME | EMAIL ADDRESS |
|---|---|
| TARO | taro@alpha.co.jp |
| HANAKO | hanako@beta.co.jp |
| – | jiro@gamma.co.jp |
| . . . | . . . |

[Fig. 12]

| |
|---|
| iwb-20130610104423.pdf |
| iwb-20130625152245.pdf |
| iwb-20130628113418.pdf |
| . . . |

[Fig. 13]

| NAME | IP ADDRESS |
|---|---|
| CONFERENCE ROOM 1 | 192.0.0.1 |
| CONFERENCE ROOM 2 | 192.0.0.2 |
| – | 192.0.0.3 |
| . . . | . . . |

[Fig. 14]

| NAME | IP ADDRESS |
|---|---|
| CONFERENCE ROOM 1 | 192.0.0.1 |
| CONFERENCE ROOM 2 | 192.0.0.2 |
| – | 192.0.0.8 |
| ⋮ | ⋮ |

[Fig. 15]

| SEQ | OPERATION NAME | SOURCE IP ADDRESS: PORT NUMBER | DESTINATION IP ADDRESS: PORT NUMBER | OPERATION TYPE | OPERATION TARGET (PAGE DATA ID/ STROKE DATA ID) | DATA |
|---|---|---|---|---|---|---|
| 1 | ADD | 192.0.0.1:50001 | 192.0.0.1:50000 | STROKE | p005 | ...... (STROKE DATA) |
| 2 | ADD | 192.0.0.1:50000 | 192.0.0.2:50001 | STROKE | p005 | ...... (STROKE DATA) |
| 3 | UPDATE | 192.0.0.2:50001 | 192.0.0.1:50000 | STROKE | s006 | (50,40) |
| 4 | UPDATE | 192.0.0.1:50000 | 192.0.0.1:50001 | STROKE | s006 | (50,40) |
| 5 | DELETE | 192.0.0.2:50001 | 192.0.0.1:50000 | STROKE | s007 | – |
| 6 | DELETE | 192.0.0.1:50000 | 192.0.0.1:50001 | STROKE | s007 | – |
| 7 | ADD | 192.0.0.1:50001 | 192.0.0.1:50000 | PAGE | – | – |
| 8 | ADD | 192.0.0.1:50000 | 192.0.0.2:50001 | PAGE | – | – |
| 9 | ADD | 192.0.0.2:50001 | 192.0.0.1:50000 | IMAGE | p006 | rico.jpg |
| 10 | ADD | 192.0.0.1:50000 | 192.0.0.1:50001 | IMAGE | p006 | rico.jpg |
| ⋮ | ⋮ | ⋮ | ⋮ | ⋮ | ⋮ | ⋮ |

[Fig. 16]

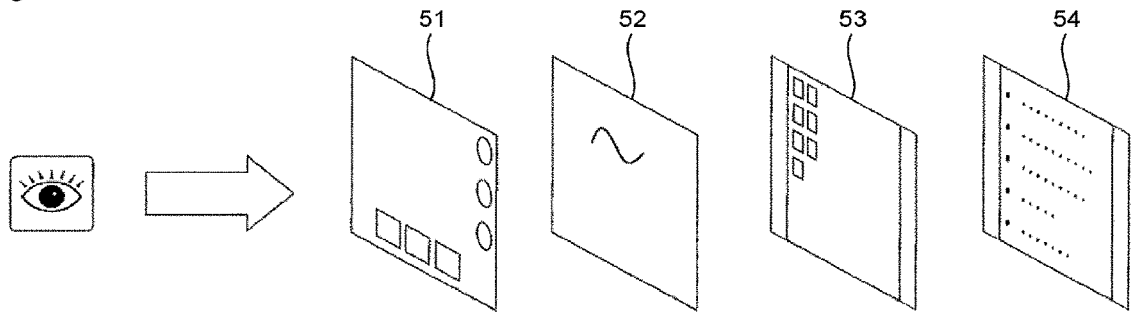

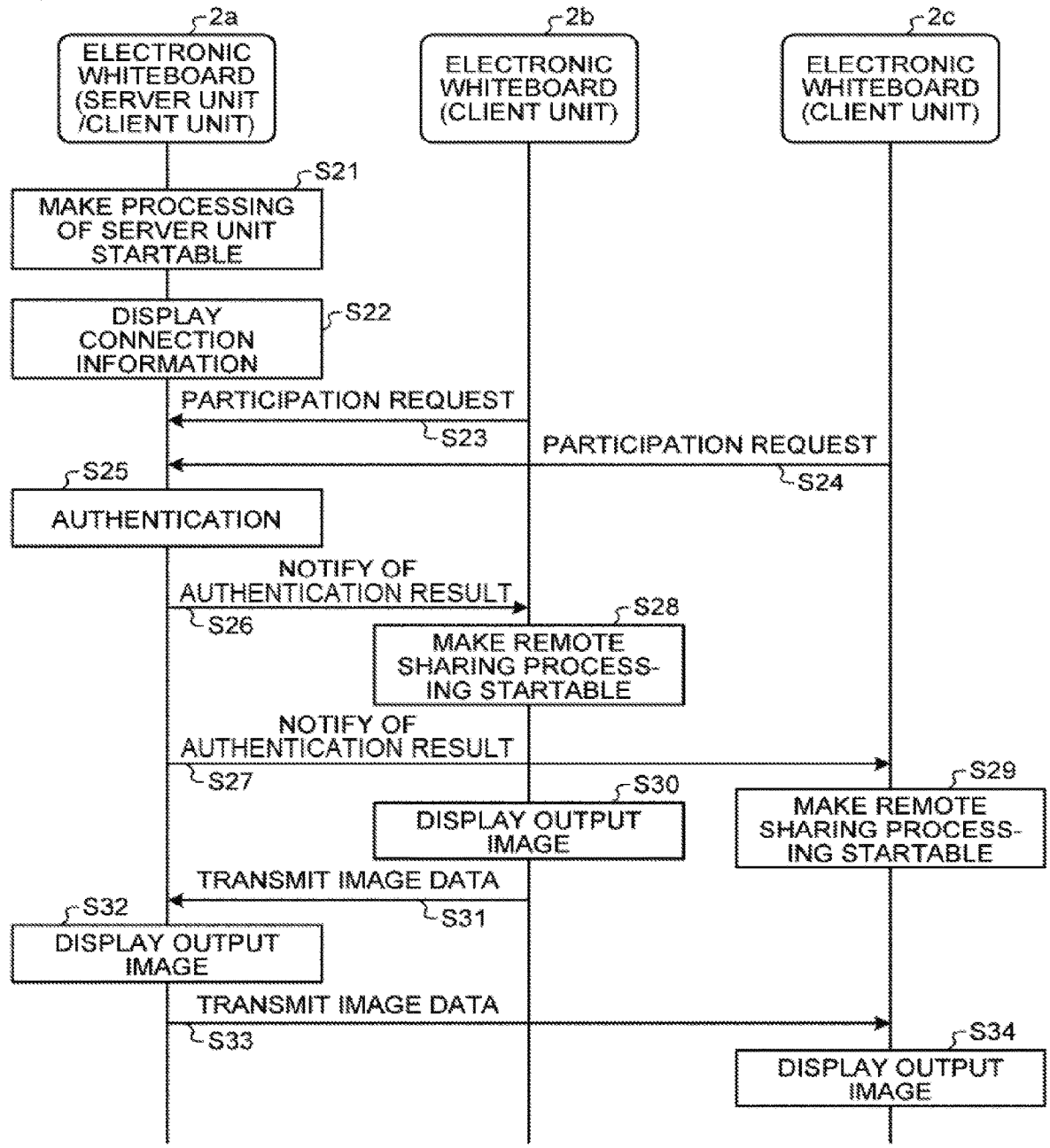

[Fig. 18]
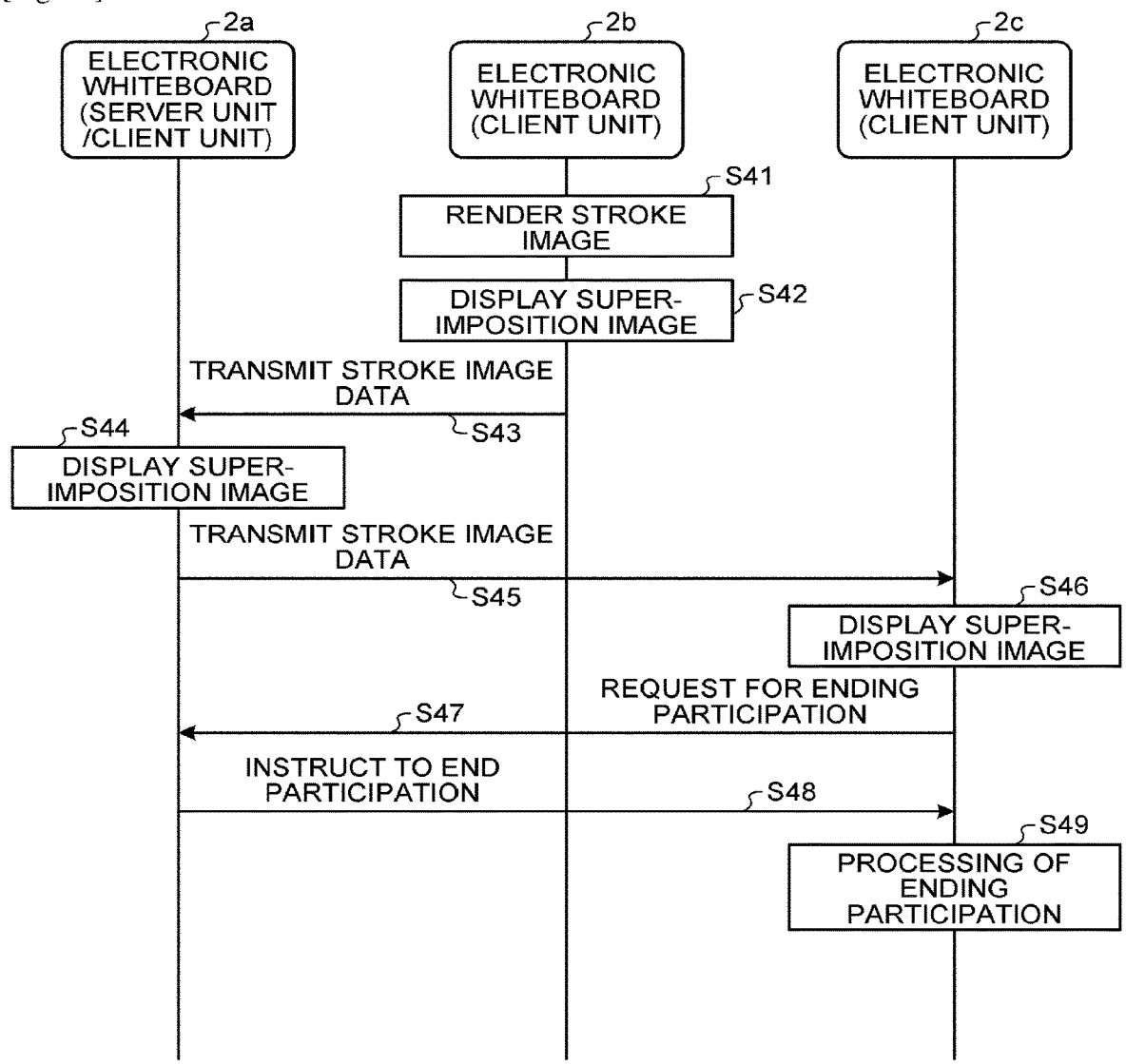

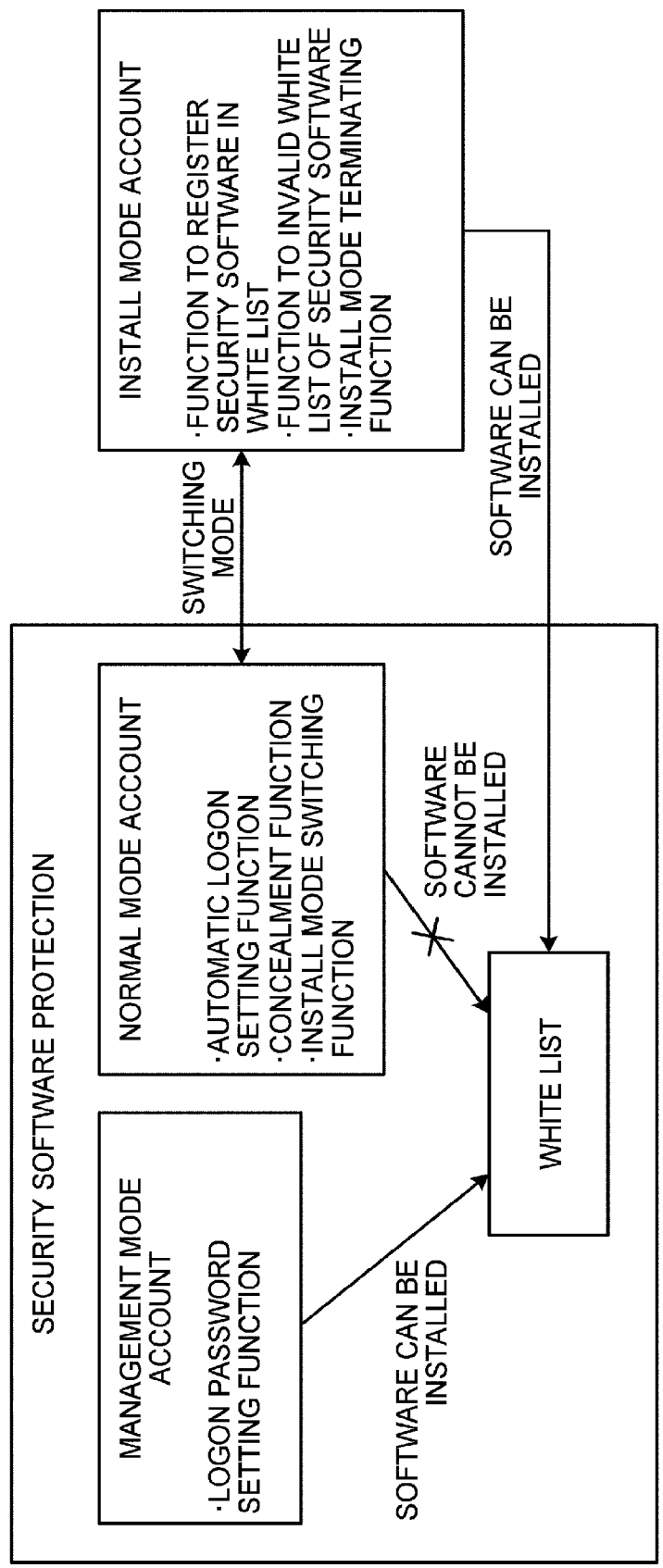
[Fig. 19]

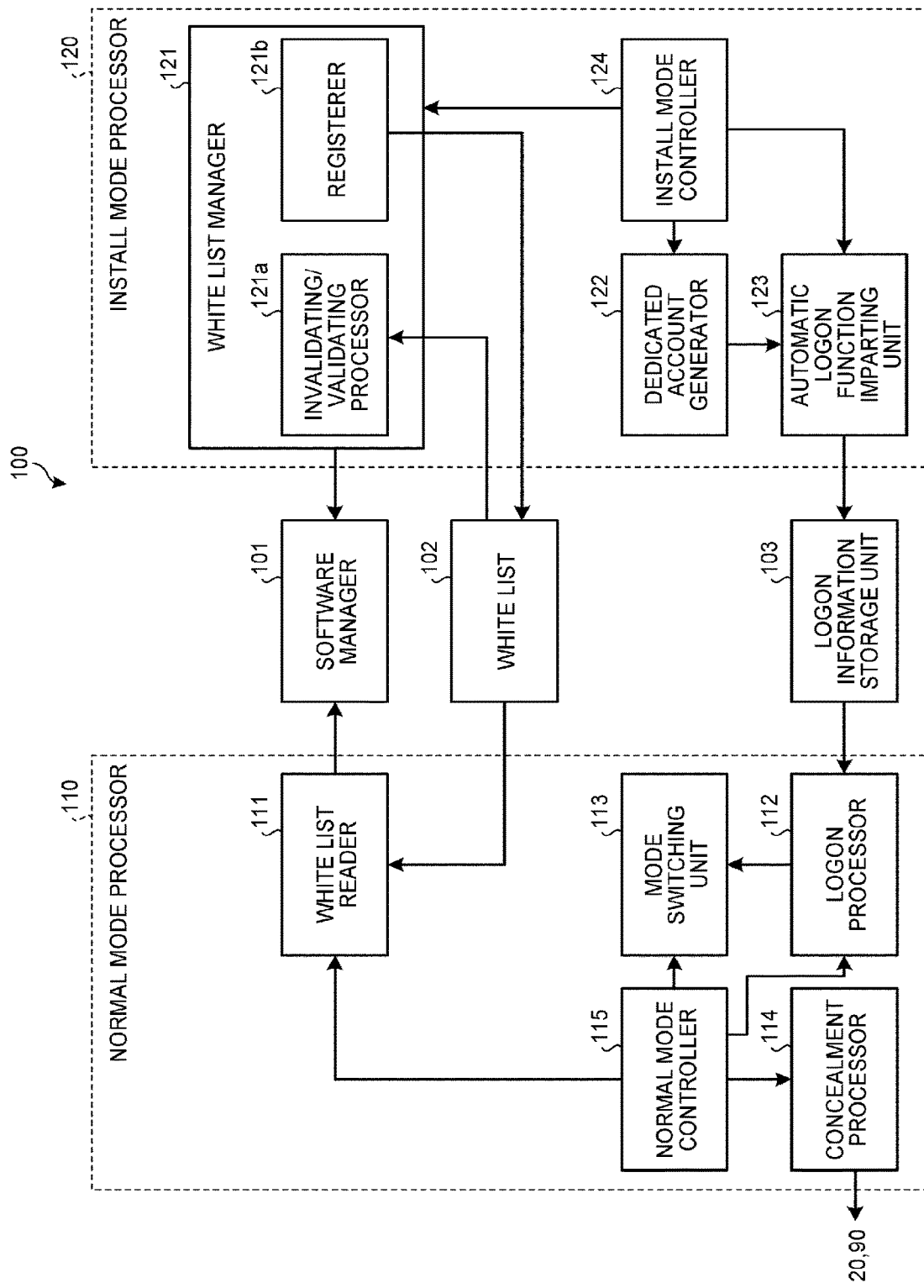
[Fig. 20]

[Fig. 21]
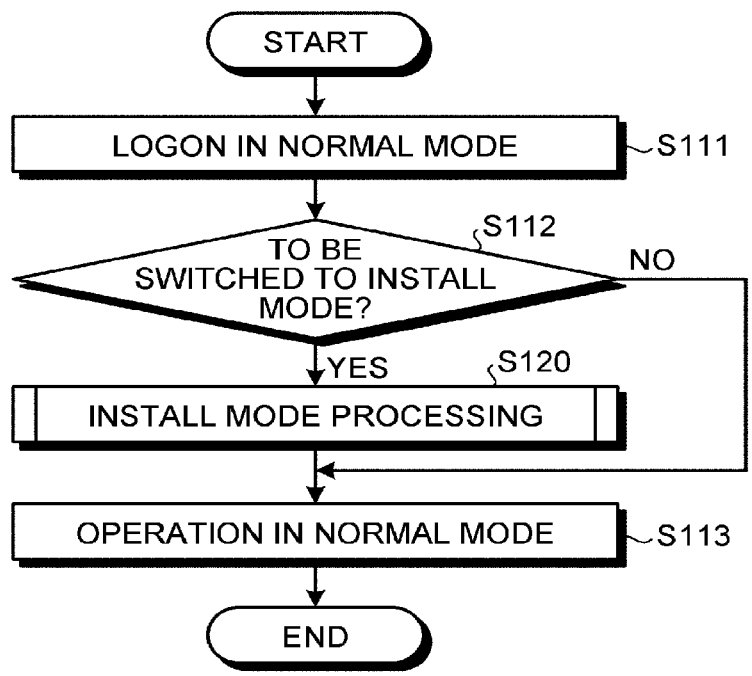

[Fig. 22]
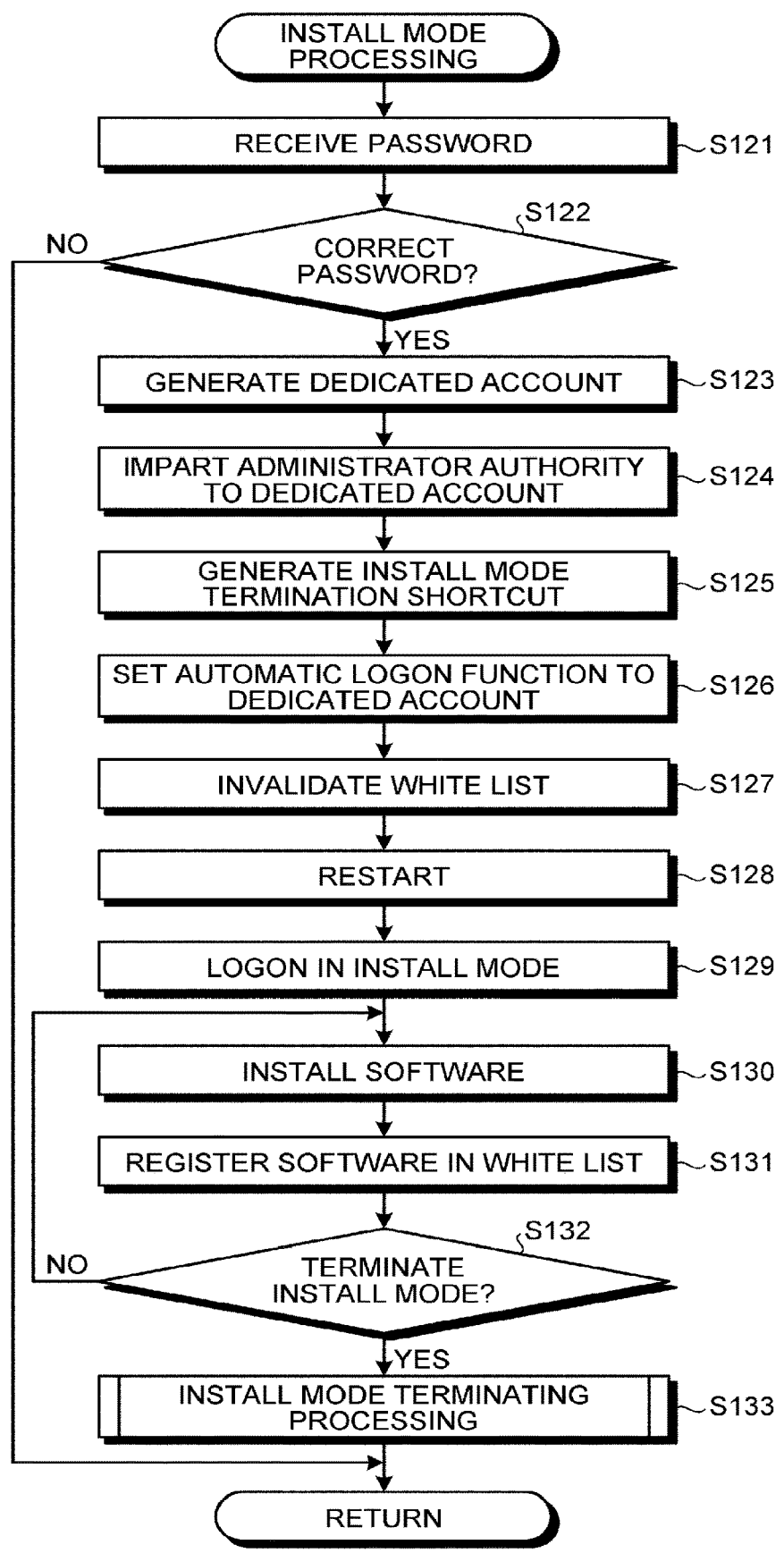

[Fig. 23]
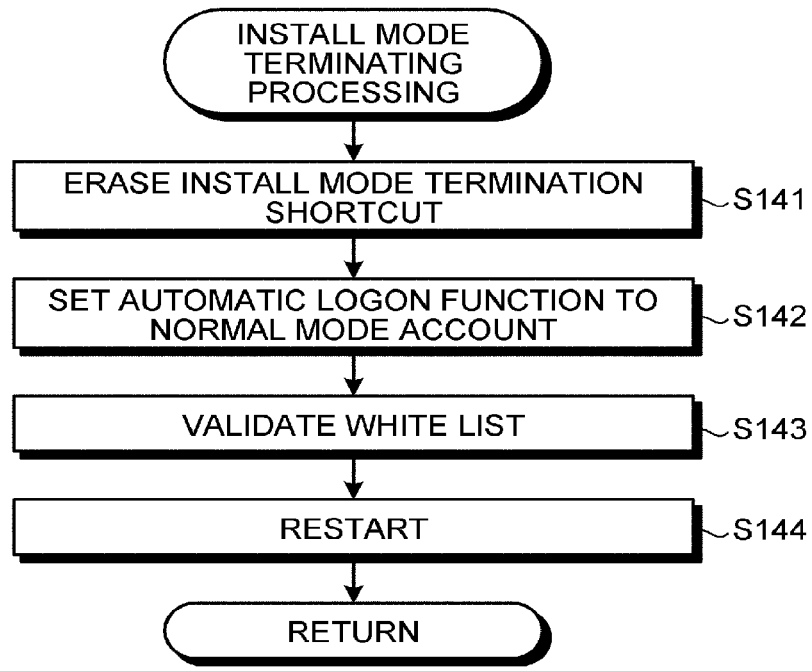

IMAGE PROCESSING DEVICE AND ELECTRONIC WHITEBOARD

CROSS-REFERENCE TO RELATED APPLICATIONS

The present application is a continuation application of International Application No. PCT/JP2016/000151, filed Jan. 13, 2016, which claims priority to Japanese Patent Application No. 2015-014520, filed Jan. 28, 2015. The contents of these applications are incorporated herein by reference in their entirety.

BACKGROUND OF THE INVENTION

1. Field of the Invention

The present invention relates to an image processing device and an electronic whiteboard including the image processing device.

2. Description of the Related Art

An electronic whiteboard, which displays a background image on a display and allows a user to draw a drawn image, such as characters, numeric characters, or drawings on the background image, has been used for a conference at companies, educational institutions, or governmental offices.

As an example of such electronic whiteboard, Japanese Unexamined Patent Application Publication No. 2008-97371 discloses a display system in which a computer device controlling a display device superimposes an insertion image on a background image and displays the superimposition image on the display device. In the display system, a drawn image generated by a user with a touch panel provided to the display device is superimposed on the background image and displayed on the display device.

In this type of system, executable software is registered in advance to prevent unknown software from executing, and a general user cannot install software. Thus, to expand the function of the electronic whiteboard, an administrator has needed to install software one by one. This takes much labors and times.

Then, an install method for enabling a general user to install software in this type of system has been proposed (for example, see Japanese Unexamined Patent Application Publication No. 2010-97428).

Japanese Unexamined Patent Application Publication No. 2010-97428 discloses a method in which an account for setup to install a predetermined program in a storage unit of a thin client terminal is set in addition to a restricted user account to allow a user to use the thin client terminal, and the predetermined program can be installed, according to the logon of the account for setup, in a storage unit of an external storing device under executing a program for setup using management information in a permitted file.

However, with the method disclosed in Japanese Unexamined Patent Application Publication No. 2010-97428, the software which can be installed using the account for setup is restricted to the software registered as permitted files in advance, and there has been a problem that user's desired software cannot be installed.

SUMMARY OF THE INVENTION

According to one aspect of the present invention, an image processing device having a software registration list in which predetermined software is registered and a function to permit software registered in the software registration list to be executed. The image processing device includes a mode switching unit, a software registration list invalidator, a software registerer, and a software registration list validator. The mode switching unit is configured to switch between a normal mode in which software unregistered in the software registration list is not permitted to be installed and an install mode in which the unregistered software is permitted to be installed. The software registration list invalidator is configured to invalidate the software registration list in the install mode. The software registerer is configured to register, in the software registration list, software installed while the software registration list is invalidated. The software registration list validator is configured to validate the software registration list after the installed software is registered in the software registration list. The mode switching unit also includes a dedicated account generator, an install mode automatic logon function imparting unit, and an install mode automatic logon permitting unit. The dedicated account generator is configured to generate an account dedicated to the install mode on a condition that authentication is established. The install mode automatic logon function imparting unit is configured to impart, to the dedicated account, an automatic logon function to the install mode. The install mode automatic logon permitting unit is configured to permit automatic logon to the install mode with the dedicated account to which the automatic logon function is imparted. The automatic logon to the install mode with the dedicated account is performed after restart processing of the image processing device is performed to reflect settings for switching the normal mode to the install mode.

BRIEF DESCRIPTION OF THE DRAWINGS

FIG. 1 is a configuration diagram of an entire image processing system of the present embodiment;

FIG. 2 is a hardware configuration diagram of an electronic whiteboard;

FIG. 3 is a functional block diagram of the electronic whiteboard;

FIG. 4 is a functional block diagram of a file processor;

FIG. 5 is a functional block diagram of a server unit and a client unit;

FIG. 6 is a schematic diagram illustrating page data;

FIG. 7 is a schematic diagram illustrating stroke data;

FIG. 8 is a schematic diagram illustrating coordinate arrangement data;

FIG. 9 is a schematic diagram illustrating media data;

FIG. 10 is a schematic diagram illustrating a remote license management table;

FIG. 11 is a schematic diagram illustrating an address book management table;

FIG. 12 is a schematic diagram illustrating backup data;

FIG. 13 is a schematic diagram illustrating a connection destination management table;

FIG. 14 is a schematic diagram illustrating a participant site management table;

FIG. 15 is a schematic diagram illustrating operation data;

FIG. 16 is a configuration diagram of image layers;

FIG. 17 is a sequence diagram illustrating processing of each electronic whiteboard;

FIG. 18 is a sequence diagram illustrating processing of each electronic whiteboard;

FIG. 19 is a diagram for explaining functions of various accounts;

FIG. 20 is a functional block diagram of a security manager;

FIG. 21 is a main flowchart of the security manager;

FIG. 22 is a flowchart illustrating install mode processing of the security manager; and FIG. 23 is a flowchart illustrating install mode terminating processing of the security manager.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an image processing device which can install user's desired software and an electronic whiteboard including the same.

In the present embodiment, it will be described the case where an image processing device according to the present invention is applied to an electronic whiteboard.

<Summary of Image Processing System 1>

FIG. 1 is a configuration diagram of an entire image processing system 1 of the present embodiment. Note that, two electronic whiteboards 2a and 2b, and electronic pens 4a and 4b accompanying the whiteboards are illustrated in FIG. 1 to simplify the description, and three or more electronic whiteboards or electronic pens may be used.

As illustrated in FIG. 1, the image processing system 1 includes a plurality of electronic whiteboards 2a and 2b as the image processing devices, a plurality of electronic pens 4a and 4b, USB memories 5a and 5b, notebook personal computers (PC) 6a and 6b, television (or video) conference terminals 7a and 7b, and a PC 8. The electronic whiteboards 2a and 2b, and the PC 8 are communicatively connected to each other through a communication network 9. Displays 3a and 3b are provided to the electronic whiteboards 2a and 2b respectively.

The electronic whiteboard 2a can display, on the display 3a, an image drawn by an event caused by the electronic pen 4a (touching the display 3a with the tip or the back end of the electronic pen 4a). The electronic whiteboard 2a can also change the image displayed on the display 3a according to an event caused by a user's hand Ha (gestures to enlarge or shrink an image, or to turn a page) as well as the electronic pen 4a.

The USB memory 5a is connectable to the electronic whiteboard 2a, and the electronic whiteboard 2a can read an electronic file, such as a PDF, from the USB memory 5a or store an electronic file in the USB memory 5a. The notebook PC 6a is connected with the electronic whiteboard 2a through a cable 10a1 capable of communication conforming to standards, such as a DisplayPort, a digital visual interface (DVI), a high-definition multimedia interface (HDMI) (registered trademark) and a video graphics array (VGA). Then, the electronic whiteboard 2a generates an event by touching the display 3a and transmits event information indicating the event to the notebook PC 6a similarly to an event from an input device, such as a mouse or a keyboard. Similarly, the television (video) conference terminal 7a is connected with the electronic whiteboard 2a through a cable 10a2 capable of communication conforming to the above standards. Note that, the notebook PC 6a and the television conference terminal 7a may communicate with the electronic whiteboard 2a by a wireless communication conforming to various wireless communication protocols, such as a Bluetooth (registered trademark).

On the other hand, at the other site where the electronic whiteboard 2b is installed, the electronic whiteboard 2b equipped with the display 3b, the electronic pen 4b, the USB memory 5b, the notebook PC 6b, the television conference terminal 7b, a cable 10b1, and a cable 10b2 are used similarly to the above. Furthermore, the image displayed on the display 3b can be changed based on an event caused by a user's hand Hb.

Thus, an image rendered on the display 3a of the electronic whiteboard 2a at a site is displayed on the display 3b of the electronic whiteboard 2b at the other site. On the other hand, an image rendered on the display 3b of the electronic whiteboard 2b at the other site is displayed on the display 3a of the electronic whiteboard 2a at the site. As described above, it is possible to perform remote sharing processing in which the same image is shared at remote places with the image processing system 1, and which is very useful in the case of a conference at remote places.

Hereinafter, an arbitrary electronic whiteboard among a plurality of electronic whiteboards is indicated as an electronic whiteboard 2. An arbitrary display among a plurality of displays is indicated as a display 3. An arbitrary electronic pen among a plurality of electronic pens is indicated as an electronic pen 4. An arbitrary USB memory among a plurality of USB memories is indicated as a USB memory 5. An arbitrary notebook PC among a plurality of notebook PCs is indicated as a notebook PC 6. An arbitrary television conference terminal among a plurality of television conference terminals is indicated as a television conference terminal 7. An arbitrary hand among a plurality of user's hands is indicated as a hand H. An arbitrary cable among a plurality of cables is indicated as a cable 10.

The electronic whiteboard will be described as an example of an image processing device in the present embodiment. However, the image processing device is not limited to this and may be an electronic signboard (digital signage), a telestrator used in sports or a weather forecast, or a remote image (video) diagnostic device as other examples. The notebook PC 6 will be described as an example of an information processing terminal. However, the information processing terminal is not limited to this and may be a terminal capable of supplying an image frame, such as a desktop PC, a tablet PC, a PDA, a digital video camera, a digital camera, or a game machine, as other examples. The communication network 9 includes the internet, a local area network (LAN), and a cellular phone communication network. The USB memory will be described as an example of a recording medium in the present embodiment. However, the recording medium is not limited to this and may be various recording medium, such as an SD card, as other examples.

<Hardware Configuration of Electronic Whiteboard 2>

Next, a hardware configuration of the electronic whiteboard 2 of the present embodiment will be described with reference to FIG. 2. FIG. 2 is a hardware configuration diagram of the electronic whiteboard 2.

As illustrated in FIG. 2, the electronic whiteboard 2 includes a controller 200 which controls the operation of the entire electronic whiteboard 2. The controller 200 includes a CPU 201 as an arithmetic unit, a ROM 202, and a RAM 203. The ROM 202 stores a program, such as an IPL, used to drive the CPU 201. The RAM 203 is used as a work area of the CPU 201

Furthermore, the electronic whiteboard 2 includes an SSD 204, a network controller 205, an external storage controller 206, a capture device 211, a graphics processor (GPU) 212, and a display controller 213. The SSD 204 stores various programs for the electronic whiteboard 2, a file of a white list 102, which will be described later, and various types of data. The network controller 205 controls the communication with the communication network 9. The external storage controller 206 controls the communication with the USB memory 5. The capture device 211 displays video information as a still image or a moving image on the display of the notebook PC 6. The GPU 212 deals only with graphics. The display controller 213 controls and manages the screen display to output an output image from the GPU 212 to the display 3 or the television conference terminal 7.

Moreover, the electronic whiteboard 2 includes a sensor controller 214 and a touch sensor 215. The sensor controller 214 controls the processing of the touch sensor 215. The touch sensor 215 detects that the electronic pen 4 or the user's hand H touches the display 3. The touch sensor 215 inputs and detects coordinates by an infrared ray shielding method. The coordinate inputting and detecting method is the method in which a plurality of infrared rays are emitted in parallel to the display 3 from two light receiving/emitting devices provided at upper both ends of the display 3 and reflected by a reflecting member provided around the display 3, and the light returning on the same optical path as that of the light emitted from the light receiving element is received. The touch sensor 215 outputs, to the sensor controller 214, the identification (ID) of the infrared ray emitted from the two light receiving/emitting devices which are shielded from each other by an object, and the sensor controller 214 recognizes the coordinate position which is the touched position of the object. Note that, all IDs indicated in the following description are examples of identification information.

The touch sensor 215 is not limited to the infrared ray shielding method, and may be various detection means, such as an electrostatic capacitance type touch panel which determines a touched position by detecting a electrostatic capacitance change, a resistive film type touch panel which determines a touched position by detecting a voltage change of facing two resistive films, or an electromagnetic induction type touch panel which determines a touched position by detecting the electromagnetic induction generated by touching the display unit by an object.

Moreover, the electronic whiteboard 2 includes an electronic pen controller 216. The electronic pen controller 216 determines whether the tip or the back end of the pen touches the display 3 by communicating to the electronic pen 4. The electronic pen controller 216 may determine whether the display 3 is touched not only by the tip or the back end of the electronic pen 4 but also by a part of the electronic pen 4 where a user grasps or other parts of the electronic pen 4.

Furthermore, the electronic whiteboard 2 includes a bus line 220, such as an address bus or a data bus, to electrically connect the CPU 201, the ROM 202, the RAM 203, the SSD 204, the network controller 205, the external storage controller 206, the capture device 211, the GPU 212, the sensor controller 214, and the electronic pen controller 216 as illustrated in FIG. 2.

The programs for the electronic whiteboard 2 may be stored in a computer-readable storage medium, such as a CD-ROM, and distributed.

<Functional Configuration of Electronic Whiteboard 2>

Next, the functional configuration of the electronic whiteboard 2 will be described with reference to FIGS. 3 to 16, and FIGS. 19 and 20. First, the functional configuration of the entire electronic whiteboard 2 will be described with reference to FIG. 3. FIG. 3 is a functional block diagram of the electronic whiteboard 2.

The electronic whiteboard 2 has functional configurations illustrated in FIG. 3 by the hardware configuration illustrated in FIG. 2 and programs. The electronic whiteboard 2 can be a host device which starts the remote sharing processing first and can be a participant device which participates in the remote sharing processing which has been started. Furthermore, the electronic whiteboard 2 is roughly divided into a client unit 20 and a server unit 90. The client unit 20 and the server unit 90 are the functions implemented in a housing of an electronic whiteboard 2. When an electronic whiteboard 2 is the host device, the client unit 20 and the server unit 90 are implemented in the electronic whiteboard 2. On the other hand, when an electronic whiteboard 2 is the participant device, the client unit 20 is implemented, but the server unit 90 is not implemented in the electronic whiteboard 2. In other words, when the electronic whiteboard 2a is the host device and the electronic whiteboard 2b is the participant device in FIG. 1, the client unit 20 of the electronic whiteboard 2a communicates with the client unit 20 of the electronic whiteboard 2b through the server unit 90 implemented in the same electronic whiteboard 2a. On the other hand, the client unit 20 of the electronic whiteboard 2b communicates with the client unit 20 of the electronic whiteboard 2a through the server unit 90 implemented in the electronic whiteboard 2a.

Functional Configuration of Client Unit 20

Next, the functional configuration of the client unit 20 will be described with reference mainly to FIGS. 3 to 5. The client unit 20 includes a video acquirer 21, a coordinate detector 22, an automatic calibrator 23, a contact detector 24, an event recognizer 25, an operation processor 26, a gesture processor 27, a video superimposition unit 28, an image processor 30, and a communication controller 60.

The video acquirer 21 acquires an output video of a video output device connected with the cable 10. When receiving an image signal from the video output device, the video acquirer 21 analyzes the image signal, derives image information, and outputs the information to the image acquirer 31. The image information includes resolution of an image frame as the display image, which is formed by the image signal, of the video output device and update frequency of the image frame.

The coordinate detector 22 detects a coordinate position of an event caused on the display 3 by a user (operation in which the user's hand H touches the display 3). Furthermore, the coordinate detector 22 detects a touched area.

The automatic calibrator 23 is started when the electronic whiteboard 2 is started, and adjusts an image processing parameter of a sensor camera in an optical sensor system of the touch sensor 215 so that the touch sensor 215 can output an appropriate value to the coordinate detector 22.

The contact detector 24 detects an event caused by a user (operation in which the display 3 is pressed (touched) with the tip or the back end of the electronic pen 4).

The event recognizer 25 sorts the coordinate position of the event detected by the coordinate detector 22 and the result detected by the contact detector 24 to the events of a stroke drawing, a UI operation, and a gesture operation.

The stroke drawing is the event in which a user presses the display 3 with the electronic pen 4, and moves the electronic pen 4 while pressing the display 3, until the user removes the electronic pen 4 from the display 3 when a stroke image 52, which will be described later, illustrated in FIG. 16 is displayed on the display 3. With the stroke drawing, for example, an alphabet of "S" or "T" is drawn on the display 3. The stroke drawing includes events in which a rendered image is erased, or a rendered image is edited as well as the event in which an image is drawn.

The UI operation is the event in which a user presses a predetermined position with the electronic pen 4 or the hand H when a UI image 51, which will be described later, illustrated in FIG. 16 is displayed on the display 3. With the UI operation, for example, the color or width of the line drawn by the electronic pen 4 is set.

The gesture operation is the event in which a user touches or moves on the display 3 with the hand H when the stroke image 52, which will be described later, illustrated in FIG. 16 is displayed on the display 3. With the gesture operation, for example, the user can enlarge (or shrink) the image, change the display area, or turn the page by moving the hand H while touching the display 3 with the hand H.

The operation processor 26 performs various operations according to a UI element of the generated event in the order of the UI operation as which the event recognizer 25 has determined the event. The UI element includes, for example, a button, a list, a checkbox, and a textbox.

The gesture processor 27 performs the operation corresponding to the event determined by the event recognizer 25 as the gesture operation.

The video superimposition unit 28 displays an image superimposed by a display superimposition unit 36, which will be described later, as a video on a video output device (the display 3 or the like). With regard to a video from a video output device (the notebook PC 6 or the like), the video superimposition unit 28 displays a video transmitted from another video output device (the television conference terminal 7 or the like) in a picture-in-picture (P in P) format. Furthermore, the video superimposition unit 28 switches the image displayed in the picture-in-picture format on a part of the display 3 to display the image on the whole display 3.

The image processor 30 performs superimposition processing of image layers illustrated in FIG. 16. The image processor 30 includes an image acquirer 31, a stroke processor 32, a UI image generator 33, a background generator 34, a layout manager 35, the display superimposition unit 36, a page processor 37, a file processor 40, a page data storage unit 300, and a remote license management table 310.

The image acquirer 31 acquires frames from the video acquired by the video acquirer 21 as images. The image acquirer 31 outputs the image data to the page processor 37. The image is equivalent to an output image 53, which is illustrated in FIG. 16, from the video output device (the notebook PC 6 or the like).

The stroke processor 32 renders an image, erases or edits the rendered image based on the event related to the stroke drawing sorted by the event recognizer 25. The image by the stroke drawing is equivalent to the stroke image 52 illustrated in FIG. 16. Furthermore, the result of rendering, erasing, or editing the image based on the stroke drawing is stored in an operation data storage unit 840 as operation data, which will be described later.

The UI image generator 33 generates a user interface (UI) image set in advance to the electronic whiteboard 2. The UI image is equivalent to the UI image 51 illustrated in FIG. 16.

The background generator 34 receives, from the page processor 37, media data among page data read from the page data storage unit 300 by the page processor 37. The background generator 34 outputs the received media data to the display superimposition unit 36. The image according to the media data is equivalent to a background image 54 illustrated in FIG. 16. The pattern of the background image 54 includes solid colors and grid display.

The layout manager 35 manages layout information indicating, to the display superimposition unit 36, the layout of each image output from the image acquirer 31, the stroke processor 32, and the UI image generator 33 (or the background generator 34). Thus, the layout manager 35 can instruct the display superimposition unit 36 to display or not to display the output image 53 and the stroke image 52 at which positions of the UI image 51 and the background image 54.

The display superimposition unit 36 layouts, based on the layout information output from the layout manager 35, the images output from the image acquirer 31, the stroke processor 32, and the UI image generator 33 (the background generator 34).

The page processor 37 integrates the data of the stroke image 52 and the data of the output image 53 into a piece of page data and stores the page data in the page data storage unit 300. The data of the stroke image 52 constitutes a part of the page data as stroke arrangement data (each stroke data) indicated by a stroke arrangement data ID illustrated in FIG. 6. The data of the output image 53 constitutes a part of the page data as the media data indicated by a media data ID illustrated in FIG. 6. The media data read from the page data storage unit 300 is treated as the data of the background image 54.

The page processor 37 transmits the media data among the temporarily stored page data to the display superimposition unit 36 through the background generator 34, and the video superimposition unit 28 can redisplay the background image 54 on the display 3 accordingly. The page processor 37 enables the stroke to be reedited by returning, to the stroke processor 32, the stroke arrangement data (each stroke data) among the page data. The page processor 37 can erase or duplicate the page data.

In other words, the data of the output image 53 displayed on the display 3 at the time when the page processor 37 stores the page data in the page data storage unit 300 is temporarily stored in the page data storage unit 300 and read as the media data indicating the background image 54 when being read from the page data storage unit 300 later. Then, the page processor 37 outputs, to the stroke processor 32, the stroke arrangement data indicating the stroke image 52 among the page data read from the page data storage unit 300. Furthermore, the page processor 37 outputs, to the background generator 34, the media data indicating the background image 54 among the page data read from the page data storage unit 300.

The display superimposition unit 36 superimposes, according to the layout specified by the layout manager 35, the output image 53 from the image acquirer 31, the stroke image 52 from the stroke processor 32, the UI image 51 from the UI image generator 33, and the background image 54 from the background generator 34. Thus, as illustrated in FIG. 16, the layers are the UI image 51, the stroke image 52, the output image 53, and the background image 54 in the order of the image seen by a user.

Furthermore, the display superimposition unit 36 can exclusively superimpose an image on the UI image 51 and the stroke image 52 by switching the output image 53 and the background image 54 illustrated in FIG. 16. For example, when the cable 10 between the electronic whiteboard 2 and a video output device (the notebook PC 6 or the like) is pulled out while the UI image 51, the stroke image 52, and the output image 53 are originally displayed, the output image 53 is excluded from the superimposition target according to the specification of the layout manager 35, and the background image 54 can be displayed. In this case, the display superimposition unit 36 also enlarges and shrinks the display, and moves the display area.

The page data storage unit 300 stores the page data illustrated in FIG. 6. FIG. 6 is a schematic diagram illustrating the page data. The page data is the data (the stroke arrangement data (each stroke data) and the media data) for one page to be displayed on the display 3. The page data includes many parameters, and the contents of the page data will be described in FIGS. 6 to 9.

As illustrated in FIG. 6, in the page data, a page data ID to identify an arbitrary one page, a start time indicating the time when the display of the page is started, an end time indicating the time when rewriting of the contents of the page by the stroke or gesture is ended, the stroke arrangement data ID to identify the stroke arrangement data generated by a stroke with the electronic pen 4 or the user's hand H, and the media data ID to identify the media data are associated and managed. The stroke arrangement data is the data to display the stroke image 52, which will be described later, illustrated in FIG. 16 on the display 3. The media data is the data to display the background image 54, which will be described later, illustrated in FIG. 16 on the display 3.

For example, when a user draws an alphabet of "S" with the electronic pen 4 with a single stroke, one stroke data ID indicates one alphabet of "S" by the page data. However, when a user draws an alphabet of "T" with the electronic pen 4 with two strokes, two stroke data IDs indicate one alphabet of "T".

The stroke arrangement data indicates detailed information as illustrated in FIG. 7. FIG. 7 is a schematic diagram illustrating the stroke data. As illustrated in FIG. 7, a piece of stroke arrangement data is indicated by a plurality of stroke data. Furthermore, a piece of stroke data indicates the stroke data ID to identify the stroke data, a start time indicating a time when one stroke is started, an end time indicating a time when the one stroke is ended, the color of the stroke, the width of the stroke, and a coordinate arrangement data ID to indicate the passing point arrangement of the stroke.

The coordinate arrangement data indicates detailed information as illustrated in FIG. 8. FIG. 8 is a schematic diagram illustrating the coordinate arrangement data. As illustrated in FIG. 8, the coordinate arrangement data indicates various types of information of a point (X coordinate value, Y coordinate value) on the display 3, the time difference (ms) between the time of the stroke's passing the point and the stroke's start time, and the writing pressure of the electronic pen 4 at the point. In other words, a plurality of points illustrated in FIG. 8 is indicated by a piece of coordinate arrangement data illustrated in FIG. 7. For example, although a user draws an alphabet of "S" with the electronic pen 4 with a single stroke, the electronic pen 4 passes a plurality of passing points until the user finishes to draw "S", and the coordinate arrangement data indicates the information on these passing points.

The media data among the page data illustrated in FIG. 6 indicates detailed information as illustrated in FIG. 9. FIG. 9 is a schematic diagram illustrating the media data. As illustrated in FIG. 9, the media data is indicated in association with the media data ID among the page data illustrated in FIG. 6, the data type of the media data, a recorded time which is the time when the page data is stored from the page processor 37 in the page data storage unit 300, the position of the image displayed on the display 3 according to the page data (X coordinate value, Y coordinate value), the image size (width and height), and data indicating the contents of the media data. The position of the image displayed on the display 3 according to the page data indicates the upper left end position of the image displayed according to the page data when it is assumed that the upper left end coordinate of the display 3 is (X coordinate value, Y coordinate value)=(0, 0).

Returning back to FIG. 3, the remote license management table 310 manages necessary license data to perform the remote sharing processing. As illustrated in FIG. 10, a product ID of the electronic whiteboard 2, a license ID for authentication, and an expiration date of the license are associated and managed in the remote license management table 310.

Functional Configuration of File Processor 40

Next, the functional configuration of the file processor 40 illustrated in FIG. 3 will be described with reference to FIG. 4. FIG. 4 is a functional block diagram of the file processor 40.

The file processor 40 includes a recovery processor 41, a file input unit 42a, a file output unit 42b, a file converter 43, a file transmitter 44, an address book input unit 45, a backup processor 46, a backup output unit 47, a setting manager 48, a setting file input unit 49a, and a setting file output unit 49b. Furthermore, the file processor 40 includes an address book management table 410, a backup data storage unit 420, a setting file storage unit 430, and a connection destination management table 440.

A recovery processor 41 detects an abnormal termination after the electronic whiteboard 2 is abnormally terminated, and recoveries unstored page data. For example, although the page data is stored as a PDF file in the USB memory 5 through the file processor 40 in the case of a normal termination, the page data remains stored in the page data storage unit 300 in the case of an abnormal termination, such as when the power is down. In this case, the recovery processor 41 recovers the page data by reading the page data from the page data storage unit 300 when the power is ON again.

The file input unit 42a reads a PDF file from the USB memory 5 and stores each page as the page data in the page data storage unit 300.

The file converter 43 converts the page data stored in the page data storage unit 300 into a PDF format file.

The file output unit 42b stores the PDF file output by a file converter 42 in the USB memory 5.

The file transmitter 44 attaches the PDF file generated by the file converter 43 to an electronic mail and transmits the email. The display superimposition unit 36 displays the contents of the address book management table 410 on the display 3, and the file transmitter 44 receives the selection of the destination by the user's operation of an input device, such as a touch panel. The transmission destination of the file is determined accordingly. As illustrated in FIG. 11, the name of the destination and the email address of the electronic mail destination are associated and managed in the address book management table 410. Alternatively, the file transmitter 44 may receive the input of an email address as a destination by the user's operation of an input device, such as a touch panel.

The address book input unit 45 reads a list file of electronic mail addresses from the USB memory 5 and manages the file at the address book management table 410.

The backup processor 46 backups the file output by the file output unit 42b or the file transmitted by the file transmitter 44 by storing the file in the backup data storage unit 420. Note that, the backup processing is not performed unless a user sets the backup. The backup data is stored in a PDF format as illustrated in FIG. 12.

The backup output unit 47 stores the backed-up file in the USB memory 5. When the file is stored, a password is input for security by the user's operation of an input device, such as a touch panel.

The setting manager 48 manages the various types of setting information on the electronic whiteboard 2 by storing and reading the information in and from the setting file storage unit 430. The various types of setting information includes, for example, a network setting, a date and time setting, a region and language setting, a mail server setting, an address book setting, a connection destination list setting, and a backup setting. The network setting includes, for example, an IP address setting for the electronic whiteboard 2, a netmask setting, a default gateway setting, and a domain name system (DNS) setting.

The setting file output unit 49b stores the various types of setting information on the electronic whiteboard 2 in the USB memory 5 as a setting file. Note that, a user cannot see the contents of the user setting file by security.

The setting file input unit 49a reads the setting file stored in the USB memory 5 and reflects the various types of setting information in the various settings of the electronic whiteboard 2.

An address book input unit 50 reads a list file of connection destination IP addresses for the remote sharing processing from the USB memory 5 and manages the file at the connection destination management table 440. As illustrated in FIG. 13, the connection destination management table 440 is the table managed in advance to reduce the labor of the user of the participant device to input the IP address of the electronic whiteboard 2 functioning as the host device when the electronic whiteboard 2 is the participation device which will participate in the remote sharing processing. The name of the site where the electronic whiteboard 2 as the host device, in which the participation device can participate, and the IP address of the electronic whiteboard 2 as the host device are associated and managed in the connection destination management table 440.

Note that, the connection destination management table 440 may not be included. However, the user of the participant device needs to input the IP address of the host device with an input device, such as a touch panel, to start the remote request processing between the host device and the participant device in this case. Thus, the user of the participant device is notified of the IP address of the host device by the user of the host device by telephone or an electronic mail.

Functional Configuration of Communication Controller 60

Next, the functional configuration of the communication controller 60 will be described with reference to FIG. 5.

The communication controller 60 controls, through the communication network 9, the communication with another electronic whiteboard 2 or the communication with a communication controller 70, which will be described later, of the server unit 90. The communication controller 60 includes a remote start processor 61, a remote participation processor 62, a remote image transmitter 63, a remote image receiver 64, a remote operation transmitter 65, a remote operation receiver 66, and a participant site management table 610.

The remote start processor 61 requests the server unit 90 of the same electronic whiteboard 2 to newly perform the remote sharing processing and receives the request result from the server unit 90. In this case, the remote start processor 61 refers to the remote license management table 310 and can request the server unit 90 to start the remote sharing processing when the license information (a product ID, a license ID, and an expiration date) is managed. If the license information is not managed, the remote start processor 61 cannot request the server unit 90 to start the remote sharing processing.

The participant site management table 610 is the table to manage the electronic whiteboard 2 as the participant device which currently participates in the remote sharing processing when the electronic whiteboard 2 is the host device. As illustrated in FIG. 14, the name of the site, where the participating electronic whiteboard 2 is installed, and the IP address of the electronic whiteboard 2 are associated and managed in the participant site management table 610.

The remote participation processor 62 requests, through the communication network 9, a remote connection request receiver 71 of the server unit 90 of the electronic whiteboard 2 as the host device which has started the remote sharing processing to participate in the remote sharing processing. In this case, the remote participation processor 62 also refers to the remote license management table 310. When the remote participation processor 62 participates in the remote sharing processing which has been started, the remote participation processor 62 refers to the connection destination management table 440 and acquires the IP address of the electronic whiteboard 2 which is the participation destination. Note that, the remote participation processor 62 may not refer to the connection destination management table 440, and the IP address of the electronic whiteboard 2 which is the participation destination may be input by a user's operation of an input device, such as a touch panel.

The remote image transmitter 63 transmits, to the server unit 90, the output image 53 transmitted from the video acquirer 21 through the image acquirer 31.

The remote image receiver 64 enables the remote sharing processing by receiving, from the server unit 90, the image data from the video output device connected with the other electronic whiteboard 2 and outputting the data to the display superimposition unit 36.

The remote operation transmitter 65 transmits various types of operation data necessary for the remote sharing processing to the server unit 90. The various types of operation data includes, for example, data relating to adding a stroke, erasing a stroke, editing (enlarging, shrinking, moving) a stroke, storing page data, creating page data, duplicating page data, erasing page data, switching a display page. Furthermore, the remote operation receiver 66 performs the remote sharing processing by receiving, from the server unit 90, the operation data input at the other electronic whiteboard 2 and outputting the data to the image processor 30.

Functional Configuration of Server Unit 90

Next, the functional configuration of the server unit 90 will be described with reference to FIG. 5. The server unit 90 is provided to each electronic whiteboard 2, and any electronic whiteboard 2 can function as the server unit 90. The server unit 90 includes the communication controller 70, and a data manager 80.

Functional Configuration of Communication Controller 70

Next, the functional configuration of the communication controller 70 will be described with reference to FIG. 5.

The communication controller 70 controls the communication with the communication controller 70 of the client unit 20 of the same electronic whiteboard 2, and the communication with the communication controller 70 of the client unit 20 of the other electronic whiteboard 2 through the communication network 9. The data manager 80 manages the operation data and the image data.

To be described in detail, the communication controller 70 includes a remote connection request receiver 71, a remote connection result transmitter 72, a remote image receiver 73, a remote image transmitter 74, a remote operation receiver 75, and a remote operation transmitter 76.

The remote connection request receiver 71 receives, from the remote start processor 61, the start request of the remote sharing processing, and receives, from the remote participation processor 62, the participation request to the remote sharing processing. The remote connection result transmitter 72 transmits, to the remote start processor 61, the result of the start request of the remote sharing processing, and transmits, to the remote participation processor 62, the result of the participation request to the remote sharing processing.

The remote image receiver 73 receives the image data from the remote image transmitter 63 (the data of the output image 53) and transmits the data to a remote image processor 82, which will be described later. The remote image transmitter 74 receives the image data from the remote image processor 82 and transmits the image data to the remote image receiver 64.

The remote operation receiver 75 receives the operation data (the data of the stroke image 52 or the like) from the remote operation transmitter 65 and transmits the data to a remote operation processor 83, which will be described later. The remote operation transmitter 76 receives the operation data from the remote operation processor 83 and transmits the operation data to the remote operation receiver 66.

Functional Configuration of Data Manager 80

Next, the functional configuration of the data manager 80 will be described with reference to FIG. 5.

The data manager 80 includes a remote connection processor 81, a remote image processor 82, a remote operation processor 83, an operation synthesis processor 84, and a page processor 85. The server unit 90 includes a passcode manager 810, a participant site management table 820, an image data storage unit 830, an operation data storage unit 840, and a page data storage unit 850.

The remote connection processor 81 starts and terminates the remote sharing processing. The remote connection processor 81 confirms whether or not a user has a license, and whether or not the license is in the expiration date based on the license information received by the remote connection request receiver 71 together with the start request of the remote sharing processing from the remote start processor 61, or the license information received together with the participation request of the remote sharing processing from the remote participation processor 62. Furthermore, the remote connection processor 81 confirms whether or not the number of the participation requests from other electronic whiteboards 2 as the client units 20 exceeds a predetermined participatable number.

Moreover, the remote connection processor 81 determines whether the passcode transmitted from other electronic whiteboard 2 with the participation request to the remote sharing processing is the same as that managed in the passcode manager 810, and permits to participate in the remote sharing processing when the passcode is the same. The passcode is issued by the remote connection processor 81 at the time when the remote sharing processing is newly started, and notified to the user of the electronic whiteboard 2 as the participant device which will participate in the remote sharing processing by the user of the electronic whiteboard 2 as the host device by telephone or an electronic mail. Thus, the user of the participant device which will participate in the remote sharing processing requests the participation by inputting the passcode to the participant device with an input device, such as a touch panel, and is permitted to participate accordingly. Note that, only with the confirmation of the license state, the confirmation of the passcode may be omitted by prioritizing user's convenience over security.

When the electronic whiteboard 2 is the host device, the remote connection processor 81 stores, in the participant site management table 820 of the server unit 90, participant site information included in the participation request transmitted from the remote participation processor 62 of the participant device through the communication network 9. Then, the remote connection processor 81 reads remote site information stored in the participant site management table 820 and transmits the information to the remote connection result transmitter 72. The remote connection result transmitter 72 transmits the remote site information to the remote start processor 61 of the client unit 20 as the same host device. The remote start processor 61 stores the remote site information in the participant site management table 610. Thus, in the host device, the remote site information is managed at both of the client unit 20 and the server unit 90.

The remote image processor 82 receives the image data (the output image 53) from a video output device (the notebook PC 6 or the like) connected with the client unit 20 of each electronic whiteboard 2 performing the remote sharing processing (including the client unit 20 of the own electronic whiteboard 2 as the host device), stores the data in the image data storage unit 830, and determines the display order of the image data to which the remote sharing processing is to be performed in the order of the reception time of the server unit 90 of the own electronic whiteboard 2 as the host device. Furthermore, the remote image processor 82 refers to the participant site management table 820 and transmits the image data to all of the client units 20 of the electronic whiteboards 2 participating in the remote sharing processing (including the client unit 20 of the own electronic whiteboard 2 as the host device) through the communication controller 70 (the remote image transmitter 74) in the above determined order.

The remote operation processor 83 receives the various types of operation data (the stroke image 52 or the like), such as a stroke image rendered by the client unit 20 of each electronic whiteboard 2 performing the remote sharing processing (including the client unit 20 of the own electronic whiteboard 2 as the host device) and determines the display order of images to which the remote sharing processing is to be performed in the order of the reception time of the server unit 90 of the own electronic whiteboard 2 as the host device. Note that, the various types of operation data is the same as the above described various types of operation data. Furthermore, the remote operation processor 83 refers to the participant site management table 820 and transmits the operation data to all of the client units 20 of the electronic whiteboards 2 performing the remote sharing processing (including the client unit 20 of the own electronic whiteboard 2 as the host device).

The operation synthesis processor 84 synthesizes the operation data of each electronic whiteboard 2 output from the remote operation processor 83, stores the operation data as the synthesis result in the operation data storage unit 840, and returns the data to the remote operation processor 83. By transmitting the operation data from the remote operation transmitter 76 to the client unit 20 of the electronic whiteboard 2 as the host device and the client unit 20 of the electronic whiteboard 2 as the participant device, the image according to the same operation data in each electronic whiteboard 2 is displayed. As illustrated in FIG. 15, the operation data is indicated in association with a sequence (SEQ), the operation name of the operation data, the IP address of the electronic whiteboard 2 which is the transmission source of the operation data and the port number of the client unit 20 (the server unit 90), the IP address of the electronic whiteboard 2 which is the transmission destination of the operation data and the port number (Port No.) of the client unit 20 (the server unit 90), the operation type of the operation data, the operation target of the operation data, and the data indicating the contents of the operation data. For example, the SEQ 1 indicates that the operation data is transmitted to the server unit (Port No.: 50000) of the electronic whiteboard (IP address: 192.0.0.1) as the same host device when a stroke is drawn at the client unit (Port No.: 50001) of the electronic whiteboard (IP address: 192.0.0.1) as the host device. In this case, the operation type is "STROKE", the operation target is the page data ID "p005", and the data indicating the contents of the operation data is the data indicating the stroke.

Furthermore, the SEQ 2 indicates that the operation data is transmitted from the server unit (Port No.: 50000) of the electronic whiteboard (IP address: 192.0.0.1) as the host device to the client unit (Port No.: 50001) of the other electronic whiteboard (IP address: 192.0.0.1) as the participant device.

Note that, since the operation synthesis processor 84 combines the data in the order that the operation data is input to the operation synthesis processor 84, the stroke image 52 is displayed on all of the display 3 of the electronic whiteboards 2 performing the remote sharing processing in the stroke order by the user of each electronic whiteboard 2 unless the communication network 9 is congested.

The page processor 85 has a function similar to the page processor 37 of the image processor 30 of the client unit 20, and the server unit 90 also stores the page data illustrated in FIGS. 6 to 8 in the page data storage unit 850. Note that, the page data storage unit 850 is similar to the page data storage unit 300 of the image processor 30, and the description thereof will be omitted.

Functions of Various Accounts

Next, the function of various accounts used in a security manager 100 will be described with reference to FIG. 19.

As illustrated in FIG. 19, the electronic whiteboard 2 in the present embodiment can logon with three accounts of a management mode account, a normal mode account, an install mode account.

The management mode account is used when a certain user, such as a system developer, expands or edits the system and has a function to set a logon password.

The normal mode account is used by a general user and has an automatic logon setting function to automatically logon, a concealment function to restrict system settings and to ensure the security, and a switching function to an install mode in which a certain general user can install desired software.

The management mode account and the normal mode account are protected by security software. As illustrated, a white list as a software registration list is also protected by the security software. In the white list, predetermined software is registered as execution-permitted software in the electronic whiteboard 2 of the present embodiment. In other words, the electronic whiteboard 2 has a function to execute only the software registered in the white list.

With the management mode account, software unregistered in the white list can be installed and newly registered in the white list. On the other hand, with the normal mode account, software unregistered in the white list cannot be installed. However, in the present embodiment, by switching the normal mode to the install mode, it is possible for a certain general user to install desired software.

The install mode account is possessed by a certain user among general users and has functions to register desired software in the white list, to invalid the white list, and to terminate the install mode.

Functional Configuration of Security Manager 100

Next, the functional configuration of the security manager 100 will be described with reference to FIG. 20. Note that, the configuration related to the management mode to which a user can logon with the management mode account (see FIG. 19) is not directly related to the present invention, and the configuration related to the management mode is not illustrated in FIG. 20.

As illustrated in FIG. 20, the security manager 100 of the present embodiment includes a software manager 101, a white list 102 as a software registration list, a logon information storage unit 103, a normal mode processor 110, and an install mode processor 120. The software manager 101 manages software which operates in the electronic whiteboard 2. The logon information storage unit 103 stores logon information. The normal mode processor 110 performs processing in the normal mode in which the software unregistered in the white list 102 is not permitted to be installed. The install mode processor 120 performs processing in the install mode in which the unregistered software is permitted to be installed. Note that, the software manager 101, the normal mode processor 110 and the install mode processor 120 are constituted by, for example, the controller 200 (see FIG. 2). Furthermore, the white list 102 and the logon information storage unit 103 are constituted by, for example, the SSD 204 (see FIG. 2).

The normal mode processor 110 includes a white list reader 111, a logon processor 112, a mode switching unit 113, a concealment processor 114, and a normal mode controller 115.

The install mode processor 120 includes a white list manager 121, a dedicated account generator 122, an automatic logon function imparting unit 123, and an install mode controller 124.

The software manager 101 reads the contents of the white list 102 through the white list reader 111 in the normal mode. Furthermore, the software manager 101 prohibits software unregistered in the white list 102 from being executed. On the other hand, in the install mode, the software manager 101 can read the contents of the white list 102 through an invalidating/validating processor 121*a* only when the white list 102 can be read as described later.

In the white list 102, predetermined software to be executed in the electronic whiteboard 2 is to be registered.

The logon information storage unit 103 stores various types of information to logon to the electronic whiteboard 2. Specifically, the logon information storage unit 103 stores account information on the normal mode and the install mode. The account information is capable of identifying a user and includes, for example, a user name and a password. Note that, in the present embodiment, a function to automatically logon is imparted in advance to the normal mode account, and a user automatically logon with the normal mode account when the electronic whiteboard 2 is powered ON.

The white list reader 111 reads the information on the software registered in the white list 102 and outputs the information to the software manager 101.

The logon processor 112 reads the account information from the logon information storage unit 103 and performs the logon processing in the normal mode or the install mode. Furthermore, the logon processor 112 permits a user to automatically logon to the install mode with the account dedicated to the install mode, to which the automatic logon function is imparted by the automatic logon function imparting unit 123 which will be described later. Moreover, the logon processor 112 permits a user to automatically logon to the normal mode with the account dedicated to the normal mode, to which the automatic logon function is imparted by the automatic logon function imparting unit 123 which will be described later. Note that, the logon processor 112 is an example of an install mode automatic logon permitting unit and a normal mode automatic logon permitting unit.

The mode switching unit 113 switches the mode to the normal mode or the install mode according to the account information.

The concealment processor 114 performs the concealment processing so that a user who uses the electronic whiteboard 2 in the normal mode cannot change the settings related to the client unit 20 and the server unit 90.

The normal mode controller 115 controls the operation of the entire normal mode processor 110.

The white list manager 121 includes the invalidating/validating processor 121*a* to perform the processing to invalidate or validate the white list 102 and a registerer 121*b* to register new software in the white list 102. The invalidating/validating processor 121*a* can invalidate the white list 102 by, for example, invalidating security software. Note that, the invalidating/validating processor 121*a* is an example of a software registration list invalidator and a software validator. Furthermore, the registerer 121*b* is an example of a software registerer.

The dedicated account generator 122 generates an account dedicated to the InstallShield after the mode switching unit 113 switches the normal mode to the install mode.

The automatic logon function imparting unit 123 imparts, to the dedicated account generated by the dedicated account generator 122, a function to automatically logon to the install mode. When the install mode is switched to the normal mode, the automatic logon function imparting unit 123 imparts, to the normal mode account, a function to automatically logon to the normal mode before the switching. Note that, the automatic logon function imparting unit 123 is an example of an install mode automatic logon function imparting unit and a normal mode automatic logon function imparting unit.

The install mode controller 124 controls the operation of the entire install mode processor 120.

<Processing or Operation of Embodiment>

Next, the processing or the operation of the present embodiment will be described with reference to FIGS. 17 and 18. FIGS. 17 and 18 are sequence diagrams illustrating the processing of each electronic whiteboard.

In the embodiment illustrated in FIGS. 17 and 18, it will be described that the electronic whiteboard 2*a* functions as the host device which hosts the remote sharing processing (the server unit 90 and the client unit 20), and the electronic whiteboards 2*b* and 2*c* function as the participant device which participates in the remote sharing processing (the client unit 20). Here, the electronic whiteboards 2*a*, 2*b*, and 2*c* are connected with the displays 3*a*, 3*b*, and 3*c* respectively, and further connected with the notebooks PC 6*a*, 6*b*, and 6*c* respectively. Furthermore, the electronic pens 4*a*, 4*b*, and 4*c* are used at the electronic whiteboards 2*a*, 2*b*, and 2*c* respectively.

Participation Processing

First, the processing for the electronic whiteboards 2*b* and 2*c* to participate in the remote sharing processing will be described with reference to FIG. 17.

When a user turns on the power switch of the electronic whiteboard 2*a*, the client unit 20 of the electronic whiteboard 2*a* is started. Then, when the user starts the server unit 90 by the operation of an input device, such as a touch panel, the remote start processor 61 of the client unit 20 outputs the instruction to the remote connection request receiver 71 of the server unit 90 of the same electronic whiteboard 2*a* to start the processing of the server unit 90. Thus, in the electronic whiteboard 2*a*, the server unit 90 as well as the client unit 20 can start various types of processing (step S21).

Next, the UI image generator 33 of the client unit 20 of the electronic whiteboard 2*a* generates connection information to establish the connection with the electronic whiteboard 2*a*, and the video superimposition unit 28 displays the connection information acquired from the UI image generator 33 through the display superimposition unit 36 on the display 3*a* (step S22). The connection information includes the IP address of the host device and a passcode generated for this remote sharing processing. In this case, the passcode stored in the passcode manager 810 is read by the remote connection processor 81 illustrated in FIG. 5 and transmitted to the remote connection result transmitter 72 and then to the remote start processor 61. Furthermore, the passcode is transmitted from the communication controller 60 including the remote start processor 61 to the image processor 30 illustrated in FIG. 3 and input to the UI image generator 33 in the end. Thus, the connection information includes the passcode. Then, the connection information is notified to the users of the electronic whiteboards 2*b* and 2*c* by the user of the electronic whiteboard 2*a* by telephone or an electronic mail. Note that, the participant device can request the participation as long as the connection destination management table 440 is included if the IP address of the host device is not included in the connection information.

Next, when the electronic whiteboards 2*b* and 2*c* receive the connection information by each user's operation of an input device, such as a touch panel, the remote participation processor 62 of the client unit 20 of each of the electronic whiteboards 2*a* and 2*b* transmits, based on the IP address in the connection information, the passcode to the communication controller 70 of the server unit 90 of the electronic whiteboard 2*a* through the communication network 9 and requests the participation (steps S23 and S24). Thus, the remote connection request receiver 71 of the communication controller 70 receives the participation request (including the passcode) from each of the electronic whiteboards 2b and 2c and outputs the passcode to the remote connection processor 81.

Next, the remote connection processor 81 authenticates the passcode received from each of the electronic whiteboards 2b and 2c using the passcode managed by the passcode manager 810 (step S25). Then, the remote connection result transmitter 72 notifies the client unit 20 of each of the electronic whiteboards 2b and 2c of the authentication result (steps S26 and S27). With the authentication in step S25, the connection for the remote sharing processing between the electronic whiteboard 2a as the host device and the electronic whiteboards 2b and 2c as the participant devices is established when the electronic whiteboards 2b and 2c are determined as the valid electronic whiteboards, and the remote participation processor 62 of the client unit 20 of each of the electronic whiteboards 2b and 2c enables the start of the remote sharing processing between other electronic whiteboards (steps S28 and S29).

Display of Output Image

Next, the processing to display the output image 53 in the remote sharing processing will be described with reference to FIG. 17.

First, the electronic whiteboard 2b displays the output image 53 on the display 3b (step S30). Specifically, the image acquirer 31 of the electronic whiteboard 2b receives the data of the output image 53 displayed on the notebook PC 6b from the notebook PC 6b through the video acquirer 21 and transmits the data to the display 3b through the display superimposition unit 36 and the video superimposition unit 28, and the output image 53 is displayed on the display 3b accordingly.

Next, the image processor 30 including the image acquirer 31 of the electronic whiteboard 2b transmits the data of the output image 53 to the remote image transmitter 63, and the communication controller 60 including the remote image transmitter 63 transmits the data of the output image 53 to the communication controller 70 of the electronic whiteboard 2a as the host device through the communication network 9 (step S31). Thus, the remote image receiver 73 of the electronic whiteboard 2a receives the data of the output image 53 and outputs the data to the remote image processor 82, and the remote image processor 82 stores the data of the output image 53 in the image data storage unit 830 accordingly.

Next, the electronic whiteboard 2a as the host device displays the output image 53 on the display 3a (step S32). Specifically, the remote image processor 82 of the electronic whiteboard 2a outputs the data of the output image 53 received from the remote image receiver 73 to the remote image transmitter 74. The remote image transmitter 74 outputs the data of the output image 53 to the remote image receiver 64 of the client unit 20 of the electronic whiteboard 2a as the same host device. The remote image receiver 64 outputs the data of the output image 53 to the display superimposition unit 36. The display superimposition unit 36 outputs the data of the output image 53 to the video superimposition unit 28. The video superimposition unit 28 outputs the data of the output image 53 to the display 3a. Thus, the output image 53 is displayed on the display 3a.

Next, the communication controller 70 including the remote image transmitter 74 of the server unit 90 of the electronic whiteboard 2a as the host device transmits the data of the output image 53 to the communication controller 60 of the electronic whiteboard 2c other than the electronic whiteboard 2b which is the transmission source of the data of the output image 53 through the communication network 9 (step S33). Thus, the remote image receiver 64 of the electronic whiteboard 2c as the participant device receives the data of the output image 53.

Next, the electronic whiteboard 2c displays the output image 53 on the display 3c (step S34). Specifically, the remote image receiver 64 of the electronic whiteboard 2c outputs the data of the output image 53 received in the above step S33 to the display superimposition unit 36 of the electronic whiteboard 2c. The display superimposition unit 36 outputs the data of the output image 53 to the video superimposition unit 28. The video superimposition unit 28 outputs the data of the output image 53 to the display 3c. Thus, the output image 53 is displayed on the display 3c.

When the data of the UI image 51 and the stroke image 52 as well as the data of the output image 53 is input to the video superimposition unit 28, the display superimposition unit 36 generates the superimposition image of the UI image 51, the stroke image 52, and the output image 53, and the video superimposition unit 28 outputs the data of the superimposition image to the display 3c. When data of a video (E) for a television conference is transmitted from the television conference terminal 7 to the video superimposition unit 28, the video superimposition unit 28 superimposes the data of the video (E) for the television conference on the superimposition image of the UI image 51, the stroke image 52, and the output image 53 in a picture-in-picture format, and outputs the data to the display 3c.

Display of Superimposition Image

Next, the processing to display the superimposition image in the remote sharing processing will be described with reference to FIG. 18.

First, in the electronic whiteboard 2b, a user draws the stroke image 52 with the electronic pen 4b on the electronic whiteboard 2b (step S41).

Next, as illustrated in FIG. 16, the display superimposition unit 36 of the electronic whiteboard 2b superimposes the stroke image 52 on the UI image 51 and the output image 53, and the video superimposition unit 28 displays the superimposition image of the UI image 51, the stroke image 52, and the output image 53 on the display 3b of the electronic whiteboard 2b (step S42). Specifically, the stroke processor 32 of the electronic whiteboard 2b receives the data of the stroke image 52 as the operation data from the coordinate detector 22 and the contact detector 24 through the event recognizer 25 and outputs the data to the display superimposition unit 36. Thus, the display superimposition unit 36 can superimpose the stroke image 52 on the UI image 51 and the output image 53, and the video superimposition unit 28 can display the superimposition image of the UI image 51, the stroke image 52, and the output image 53 on the display 3b of the electronic whiteboard 2b.

Next, the image processor 30 including the stroke processor 32 of the electronic whiteboard 2b transmits the data of the stroke image 52 to the remote operation transmitter 65, and the remote operation transmitter 65 of the electronic whiteboard 2b transmits the data of the stroke image 52 to the communication controller 70 of the electronic whiteboard 2a as the host device through the communication network 9 (step S43). Thus, the remote operation receiver 75 of the electronic whiteboard 2a receives the data of the stroke image 52 and outputs the data to the remote operation processor 83, and the remote operation processor 83 outputs the data of the stroke image 52 to the operation synthesis processor 84 accordingly. As described above, the data of the stroke image 52 rendered at the electronic whiteboard 2b is sequentially transmitted to the remote operation processor 83 of the electronic whiteboard 2*a* as the host device every time the image is drawn. The data of the stroke image 52 is the data indicated for each stroke data ID illustrated in FIG. 7. For example, since a user draws an alphabet of "T" with the electronic pen 4 with two strokes as described above, the data of the stroke images 52 indicated by two stroke data IDs is sequentially transmitted.

Next, the electronic whiteboard 2*a* as the host device displays the superimposition image, which includes the data of the stroke image 52 transmitted from the electronic whiteboard 2*b*, of the UI image 51, the stroke image 52, and the output image 53 on the display 3*a* (step S44). Specifically, the operation synthesis processor 84 of the electronic whiteboard 2*a* synthesizes a plurality of pieces of data of the stroke images 52 sequentially transmitted through the remote operation processor 83, stores the data in the operation data storage unit 840, and returns the data to the remote operation processor 83. Thus, the remote operation processor 83 outputs the data of the synthesized stroke image 52 received from the operation synthesis processor 84 to the remote operation transmitter 76. The remote operation transmitter 76 outputs the data of the synthesized stroke image 52 to the remote operation receiver 66 of the client unit 20 of the electronic whiteboard 2*a* as the same host device. The remote operation receiver 66 outputs the data of the synthesized stroke image 52 to the display superimposition unit 36 of the image processor 30. Thus, the display superimposition unit 36 superimposes the synthesized stroke image 52 on the UI image 51 and the output image 53. Finally, the video superimposition unit 28 displays the superimposition image of the UI image 51, the stroke image 52, and the output image 53 by the display superimposition unit 36 on the display 3*a*.

Next, the communication controller 70 including the remote operation transmitter 76 of the server unit 90 of the electronic whiteboard 2*a* as the host device transmits the data of the synthesized stroke image 52 to the communication controller 60 of the electronic whiteboard 2*c* other than the electronic whiteboard 2*b* which is the transmission source of the data of the stroke image 52 through the communication network 9 (step S45). Thus, the remote operation receiver 66 of the electronic whiteboard 2*c* as the participant device receives the data of the combined stroke image 52.

Next, the electronic whiteboard 2*c* displays the superimposition image of the UI image 51, the stroke image 52, and the output image 53 on the display 3*c* (step S46). Specifically, the remote operation receiver 66 of the electronic whiteboard 2*c* outputs the data of the synthesized stroke image 52 received in the above step S45 to the image processor 30 of the electronic whiteboard 2*c*. The display superimposition unit 36 of the image processor 30 superimposes the data of the UI image 51 and the output image 53 on the data of the synthesized stroke image 52 and outputs the data of the superimposition image of the UI image 51, the stroke image 52, and the output image 53 to the video superimposition unit 28. The video superimposition unit 28 outputs the data of the superimposition image of the UI image 51, the stroke image 52, and the output image 53 to the display 3*c*. Thus, the superimposition image of the UI image 51, the stroke image 52, and the output image 53 is displayed on the display 3*c*.

Note that, although the output image 53 is displayed on the display 3 in the above processing, the background image 54 instead of the output image 53 may be displayed. Alternatively, both of the output image 53 and the background image 54 may be simultaneously displayed on the display 3 without the exclusive relation between the output image 53 and the background image 54.

End of Participation

Next, the processing in which the participant device ends the participation in the remote sharing processing will be described with reference to FIG. 18. In the embodiment illustrated in FIG. 18, the processing in which the electronic whiteboard 2*c* ends the participation is illustrated.

First, when the electronic whiteboard 2*c* receives a request for ending the participation through a user's operation of an input device, such as a touch panel, the remote participation processor 62 requests to the communication controller 70 of the server unit 90 of the electronic whiteboard 2*a* as the host device to end the participation (step S47). Thus, the remote connection request receiver 71 of the communication controller 70 receives the request for ending the participation from the electronic whiteboard 2*c* and outputs the request for ending the participation to the remote connection processor 81 together with the IP address of the electronic whiteboard 2*c*. Then, the remote connection processor 81 of the electronic whiteboard 2*a* erases, from the participant site management table 820, the IP address of the electronic whiteboard 2*c* which has performed the request for ending the participation and the name of the site where the electronic whiteboard 2*c* is installed based on the IP address transmitted from the remote connection request receiver 71, and outputs the notification to the remote connection result transmitter 72 of the IP address of the electronic whiteboard 2*c* and the erasure.

Next, the communication controller 70 including the remote connection result transmitter 72 instructs the communication controller 60 of the client unit 20 of the electronic whiteboard 2*c* to end the participation through the communication network 9 (step S48). Thus, the remote participation processor 62 of the communication controller 60 of the electronic whiteboard 2*c* performs the processing of ending the participation by disconnecting the communication for the remote sharing processing, and the participation is ended accordingly (step S49).

Operation of Security Manager 100

Next, the operation of the security manager 100 will be described with reference to FIGS. 21 to 23.

First, the operation will be described with reference to the main flowchart illustrated in FIG. 21.

When the power of the electronic whiteboard 2 is ON, the logon processor 112 reads the information on the normal mode account from the logon information storage unit 103 and logons in the normal mode (step S111).

Next, the mode switching unit 113 determines whether or not the normal mode is to be switched to the install mode (step S112). For example, the mode switching unit 113 displays an icon to switch the normal mode to the install mode on the display 3 of the electronic whiteboard 2 and determines that the normal mode is to be switched to the install mode when determining that the icon is touched with the tip of the electronic pen 4 or the user's hand H.

In step S112, when determining that the normal mode is to be switched to the install mode, the mode switching unit 113 switched the normal mode to the install mode, and the install mode processing is performed by the install mode processor 120 (step S120).

On the other hand, in step S112, when determining that the normal mode is not to be switched to the install mode, the mode switching unit 113 maintains the normal mode, and the operation in the normal mode is performed by the normal mode processor 110 (step S113).

Install Mode Processing

Next, the install mode processing performed by the install mode processor 120 will be described with reference to the flowchart illustrated in FIG. 22.

First, the install mode controller 124 displays a screen to which the password is to be input on the display 3 and allows a user to input the password (step S121).

Next, the install mode controller 124 determines whether or not the input password is matched with the correct password registered in advance (step S122).

In step S122, when it has been determined that the input password is not matched with the correct password, the install mode processing is terminated.

On the other hand, step S122, when it has been determined that the input password is matched with the correct password, the dedicated account generator 122 generates an account dedicated to the install mode (step S123). Note that, when the dedicated account has been generated, the dedicated account generator 122 skips the processing of step S123.

Next, the dedicated account generator 122 imparts administrator authority to the account dedicated to the install mode (step S124), and enables the user to change the setting of the security software or access to the software to be installed.

Next, the install mode controller 124 generates a termination processing shortcut to start a termination processing command to terminate the install mode (step S125). This is to facilitate the termination processing of the install mode by generating the termination processing shortcut.

Next, the automatic logon function imparting unit 123 performs a setting to impart an automatic logon function to the account dedicated to the install mode (step S126). This is to automatically logon to the account of the install mode can be performed after the electronic whiteboard 2 is restarted because the restart processing is needed to reflect the setting to switch the normal mode to the install mode. The information on the account dedicated to the install mode to which the automatic logon function is imparted is stored in the logon information storage unit 103.

Next, the invalidating/validating processor 121a invalidates the function of the security software and enables the installed software to be registered in the white list 102 (step S127).

Next, after the restart processing of the electronic whiteboard 2 (step S128), the logon processor 112 reads the information on the account dedicated to the install mode to which the automatic logon function is imparted by the logon information storage unit 103 and automatically logons in the install mode (step S129).

Next, when the user's desired software is installed (step S130), the registerer 121b registers the information on the software in the white list 102 (step S131).

Next, the install mode controller 124 determines whether or not the install mode is to be terminated (step S132). Specifically, for example, the install mode controller 124 determines that the install mode is to be terminated when the termination processing is selected by the termination processing shortcut generated in step S125.

In step S132, when determining that the install mode is to be terminated, the install mode controller 124 performs the install mode terminating processing (step S133), and when determining that the install mode is not to be terminated, the install mode controller 124 repeats the processing after step S130.

Install Mode Terminating Processing

Next, the install mode terminating processing to be performed by the install mode processor 120 will be described with reference to the flowchart illustrated in FIG. 23.

First, the install mode controller 124 erases the termination processing shortcut (step S141).

Next, the automatic logon function imparting unit 123 performs a setting to impart an automatic logon function to the normal mode account (step S142). This is to automatically logon to the account in the normal mode after the electronic whiteboard 2 is restarted because the restart processing is needed to reflect the termination setting of the install mode. The information on the normal mode account to which the automatic logon function is imparted is stored in the logon information storage unit 103.

Next, the invalidating/validating processor 121a enables the function of the security software and validates the white list 102 (step S143). Thus, the software is not registered in the white list 102, and the security is ensured by the security software.

Next, the restart processing of the electronic whiteboard 2 is performed to reflect the termination setting of the install mode (step S144), the user automatically logons with the normal mode account, and the operation is performed in the normal mode in step S113 illustrated in FIG. 21.

The operation steps described in FIGS. 21 to 23 are programmed and stored in a storing medium, and the program is read and performed by, for example, a microcomputer, thus the microcomputer can function as the security manager 100 or as the electronic whiteboard 2 or an image processing device including the same.

As described above, the electronic whiteboard 2 of the present embodiment can invalidate the white list 102 in the install mode in which software unregistered in the white list 102 is permitted to be installed. Thus, the electronic whiteboard 2 of the present embodiment can install user's desired software.

According to an embodiment, it is possible to provide an image processing device which can install user's desired software and an electronic whiteboard including the same.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A method performed in an image processing device, the method comprising:
storing, in a memory, a software list in which execution-permitted software is listed, the software list being protected by security software and the security software having a function to permit the software included in the software list to be executed;
switching between a normal mode and an install mode, wherein in the normal mode, the security software does not permit software unlisted in the software list to be installed, and in the install mode, the security software does not permit the unlisted software to be installed;
generating a dedicated account that is dedicated to the install mode on a condition that authentication of a user is established, enabling the user to change a setting of the security software or to access the unlisted software to be installed;
imparting, to the dedicated account, an automatic logon function to the install mode;
permitting automatic logon to the install mode with the dedicated account, the automatic logon being performed after a restart processing of the image processing device to reflect settings for switching the normal mode to the install mode;
invalidating use of the software list by invalidating the function of the security software during the install mode;
including, in the software list, the unlisted software to be installed while the software list is invalidated; and
validating use of the software list by enabling the function of the security software, after the unlisted software is newly listed in the software list.

2. An image processing device, comprising:
hardware circuitry configured to
store, in a memory, a software list in which execution-permitted software is listed, the software list being protected by security software and the security software having a function to permit the software included in the software list to be executed;
switch between a normal mode and an install mode, wherein, in the normal mode, the security software does not permit software not listed in the software list to be installed, and in the install mode, the security software does permit the unlisted software to be installed;
generate a dedicated account that is dedicated to the install mode on a condition that authentication of a user is established, enabling the user to change a setting of the security software or to access the unlisted software to be installed;
impart, to the dedicated account, an automatic logon function to the install mode;
permit automatic logon to the install mode with the dedicated account, the automatic logon being performed after a restart processing of the hardware circuitry to reflect settings for switching the normal mode to the install mode;
invalidate use of the software list by invalidating the function of the security software during the install mode;
include, in the software list, the unlisted software to be installed while the software list is invalidated; and
validate use of the software list by enabling the function of the security software, after the unlisted software is newly included in the software list.

3. The image processing device according to claim 2, wherein the hardware circuitry is further configured to
impart, to a normal account of the normal mode, an automatic logon function to the normal mode; and
permit an automatic logon to the normal mode with the normal account to which the automatic logon function is imparted, wherein
the hardware circuitry validates the software list before switching the install mode to the normal mode.

4. An electronic whiteboard, comprising:
a hardware display; and
hardware circuitry configured to
store, in a memory, a software list in which execution-permitted software is listed, the software list being protected by security software and the security software having a function to permit the software included in the software list to be executed;
switch between a normal mode and an install mode, wherein, in the normal mode, the security software does not permit software not listed in the software list to be installed, and in the install mode, the security software does permit the unlisted software to be installed;
generate a dedicated account that is dedicated to the install mode on a condition that authentication of a user is established, enabling the user to change a setting of the security software or to access the unlisted software to be installed;
impart, to the dedicated account, an automatic logon function to the install mode;
permit automatic logon to the install mode with the dedicated account, the automatic logon being performed after a restart processing of the hardware circuitry to reflect settings for switching the normal mode to the install mode;
invalidate use of the software list by invalidating the function of the security software during the install mode;
include, in the software list, the unlisted software to be installed while the software list is invalidated; and
validate use of the software list by enabling the function of the security software, after the unlisted software is newly included in the software list,
wherein the hardware circuitry is further configured to
impart, to a normal account of the normal mode, an automatic logon function to the normal mode; and
permit an automatic logon to the normal mode with the normal account to which the automatic logon function is imparted, wherein
the hardware circuitry validates the software list before switching the install mode to the normal mode.

* * * * *